United States Patent
Farris et al.

(10) Patent No.: US 11,870,884 B2
(45) Date of Patent: Jan. 9, 2024

(54) SELF-SYNCHRONIZING MODE OF OPERATION FOR AN ENCRYPTION/DECRYPTION ALGORITHM

(71) Applicant: Harris Global Communications, Inc., Rochester, NY (US)

(72) Inventors: Steven M. Farris, Webster, NY (US); Michael T. Kurdziel, Rochester, NY (US)

(73) Assignee: HARRIS GLOBAL COMMUNICATIONS, INC., Rochester, NY (US)

(*) Notice: Subject to any disclaimer, the term of this patent is extended or adjusted under 35 U.S.C. 154(b) by 191 days.

(21) Appl. No.: 17/229,608

(22) Filed: Apr. 13, 2021

(65) Prior Publication Data
US 2022/0337394 A1    Oct. 20, 2022

(51) Int. Cl.
| | | |
|---|---|---|
| H04L 29/00 | (2006.01) | |
| H04L 9/06 | (2006.01) | |
| H04L 9/12 | (2006.01) | |

(52) U.S. Cl.
CPC .............. H04L 9/0631 (2013.01); H04L 9/12 (2013.01)

(58) Field of Classification Search
CPC ............................. H04L 9/0631; H04L 9/12
USPC .......................................................... 380/28
See application file for complete search history.

(56) References Cited

U.S. PATENT DOCUMENTS

| | | | |
|---|---|---|---|
| 6,108,421 A | 8/2000 | Kurdziel et al. | |
| 8,515,059 B2* | 8/2013 | Engels | G06F 21/556 |
| | | | 380/28 |
| 9,438,416 B2 | 9/2016 | Kurdziel et al. | |
| 2005/0195974 A1 | 9/2005 | Kurdziel | |
| 2016/0149696 A1* | 5/2016 | Winslow | H04L 9/12 |
| | | | 380/28 |
| 2019/0140829 A1* | 5/2019 | Kurdziel | H04L 9/0631 |

FOREIGN PATENT DOCUMENTS

WO      2012140144 A1    10/2012

OTHER PUBLICATIONS

Yang Fang et al: "Comparison of Two Self-Synchronizing Cipher Modes", Jan. 1, 2004 (Jan. 1, 2004), pp. 1-3.
Jiao Lin et al: "Stream cipher designs: a review", Science China Information Sciences, Science China Press, Beijing, vol. 63, No. 3, Feb. 10, 2020 (Feb. 10, 2020).
(Continued)

*Primary Examiner* — Jeffrey C Pwu
*Assistant Examiner* — Michael D Anderson
(74) *Attorney, Agent, or Firm* — Fox Rothschild LLP; Carol Thorstad-Forsyth

(57) ABSTRACT

Systems and methods for operating a cryptographic system. The methods comprise: obtaining ciphertext by the cryptographic system; performing operations by the cryptographic system to determine whether a given sequence of values exits within the ciphertext; and synchronizing the cryptographic system with another cryptographic system using the ciphertext as a bitrate portion of an initialization value for a cryptographic algorithm and zero as a capacity portion of the initialization value for the cryptographic algorithm, when a determination is made that the given sequence of values exist within the ciphertext.

15 Claims, 17 Drawing Sheets

(56) References Cited

OTHER PUBLICATIONS

Figure 1:
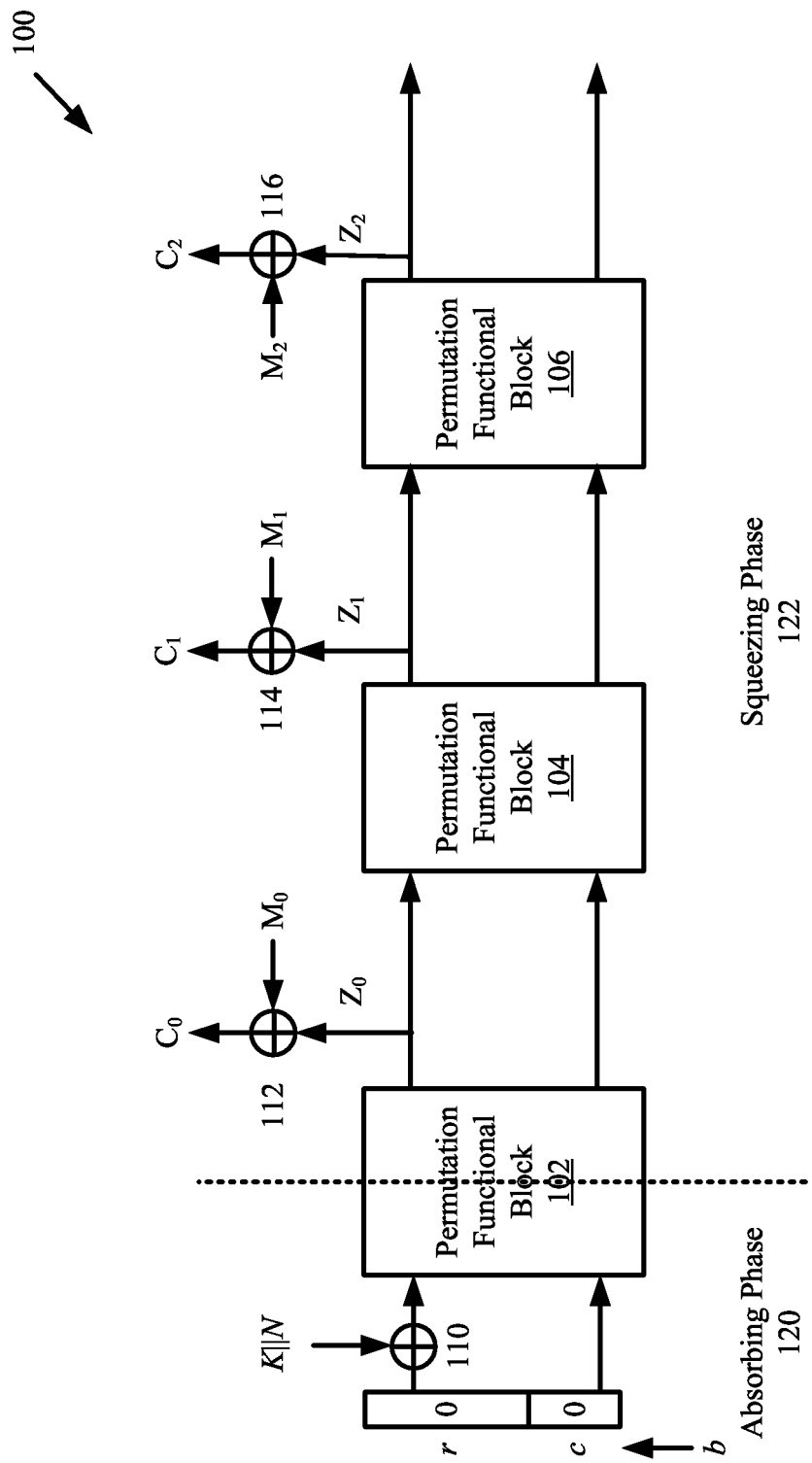

European Search Report issued in European Patent Application No. 22166111.9 dated Sep. 2, 2022.

M. Kurdziel, R. Clements, "Harris Customizable Cryptographic Architecture", Proc. IEEE, Mil. Comm. Conf., pp. 1033-1037, Oct. 1998.

M. Kurdziel, R. Clements, G. Dennis, "Customizable Cryptographic Architecture for Government & Military Communications Applications", Proc. IEEE, Mil. Comm. Conf., Oct. 2004.

* cited by examiner

SELF-SYNCHRONIZING MODE OF OPERATION FOR AN ENCRYPTION/DECRYPTION ALGORITHM

FIELD

This document relates generally to cryptographic systems. More particularly, this document relates to systems and methods for a self-synchronizing mode of operation.

BACKGROUND

There are many cryptographic algorithms known in the art. One such cryptographic algorithm is described in U.S. Pat. No. 9,438,416 to Kurdziel ("Kurdziel"). The cryptographic algorithm implements a method that generally involves: combining a cryptographic key with state initialization bits to generate first combination bits; producing a first keystream by performing a permutation function $f$ using the first combination bits as inputs thereto; and using the first keystream to encrypt first data (e.g., authentication data or message body data) so as to produce first encrypted data (e.g., via modular arithmetic). The permutation function $f$ comprises a round function $f_{round}$ that is iterated R times. The round function $f_{round}$ consists of (1) a substitution layer in which the first combination bits are substituted with substitute bits, (2) a permutation layer in which the substitute bits are re-arranged, (3) a mixing layer in which at least two outputs of the permutation layer are combined together, and (4) an addition layer in which a constant is added to the output of the mixing layer.

SUMMARY

The present disclosure concerns implementing systems and methods for operating a cryptographic system. The methods comprise: obtaining ciphertext by the cryptographic system; performing operations by the cryptographic system to determine whether a given sequence of values exits within the ciphertext; and synchronizing the cryptographic system with another cryptographic system using the ciphertext as a bitrate portion of an initialization value for a cryptographic algorithm and zero as a capacity portion of the initialization value for the cryptographic algorithm, when a determination is made that the given sequence of values exist within the ciphertext.

In some scenarios, a result from combining the plaintext with a keystream block is used as the bitrate portion of the initialization value for a cryptographic algorithm when a determination is made that the given sequence of values does not exist within the ciphertext. The cryptographic algorithm may include, but is not limited to, an adaption of a sponge construction framework. The adaptation of the sponge construction framework may include, but is not limited to, a duplex construction in which a permutation function is iteratively performed. The ciphertext may be generated by the cryptographic system in accordance with the cryptographic algorithm or received from a remote device that generated the ciphertext. The synchronized cryptographic algorithm is used to decrypt the ciphertext or to encrypt plaintext.

In some scenarios, the implementing systems comprise digital logic circuits with logic/state devices. In other scenarios, the implementing systems comprise: a processor; and a non-transitory computer-readable medium comprising programming instructions that are configured to cause the processor to implement a method for operating a cryptographic algorithm. The programming instructions comprise instructions to: obtain ciphertext by the cryptographic system; perform operations by the cryptographic system to determine whether a given sequence of values exits within the ciphertext; and synchronize the cryptographic system with another cryptographic system using the ciphertext as a bitrate portion of an initialization value for a cryptographic algorithm and zero as a capacity portion of the initialization value for the cryptographic algorithm, when a determination is made that the given sequence of values exist within the ciphertext. The programming instructions may also comprise instructions to cause the processor to use results from combining the plaintext with a keystream block as the bitrate portion of the initialization value for a cryptographic algorithm when a determination is made that the given sequence of values does not exist within the ciphertext.

The present disclosure also concerns communication devices and methods for operating the same. The communication devices comprise: a transceiver configured to transmit and receive signals including ciphertext; a cryptographic circuit configured to encrypt and decrypt information in accordance with a cryptographic algorithm; and a synchronization circuit configured to synchronize the cryptographic algorithm with a cryptographic algorithm of another communication device based on a detection of a pseudo-random event during an on-going communication session. The pseudo-random event is detected via an analysis of the ciphertext. The ciphertext is used as a bitrate portion of an initialization value for a cryptographic algorithm and zero is used as a capacity portion of the initialization value for the cryptographic algorithm, when the pseudo-random event is detected. A result from combining the plaintext with a keystream block may be used as the bitrate portion of the initialization value for the cryptographic algorithm when the pseudo-random event is not detected.

DETAILED DESCRIPTION OF THE DRAWINGS

The present solution will be described with reference to the following drawing figures, in which like numerals represent like items throughout the figures.

FIG. 1 provides an illustration of a sponge construction employing a unique permutation function.

Figure 2:
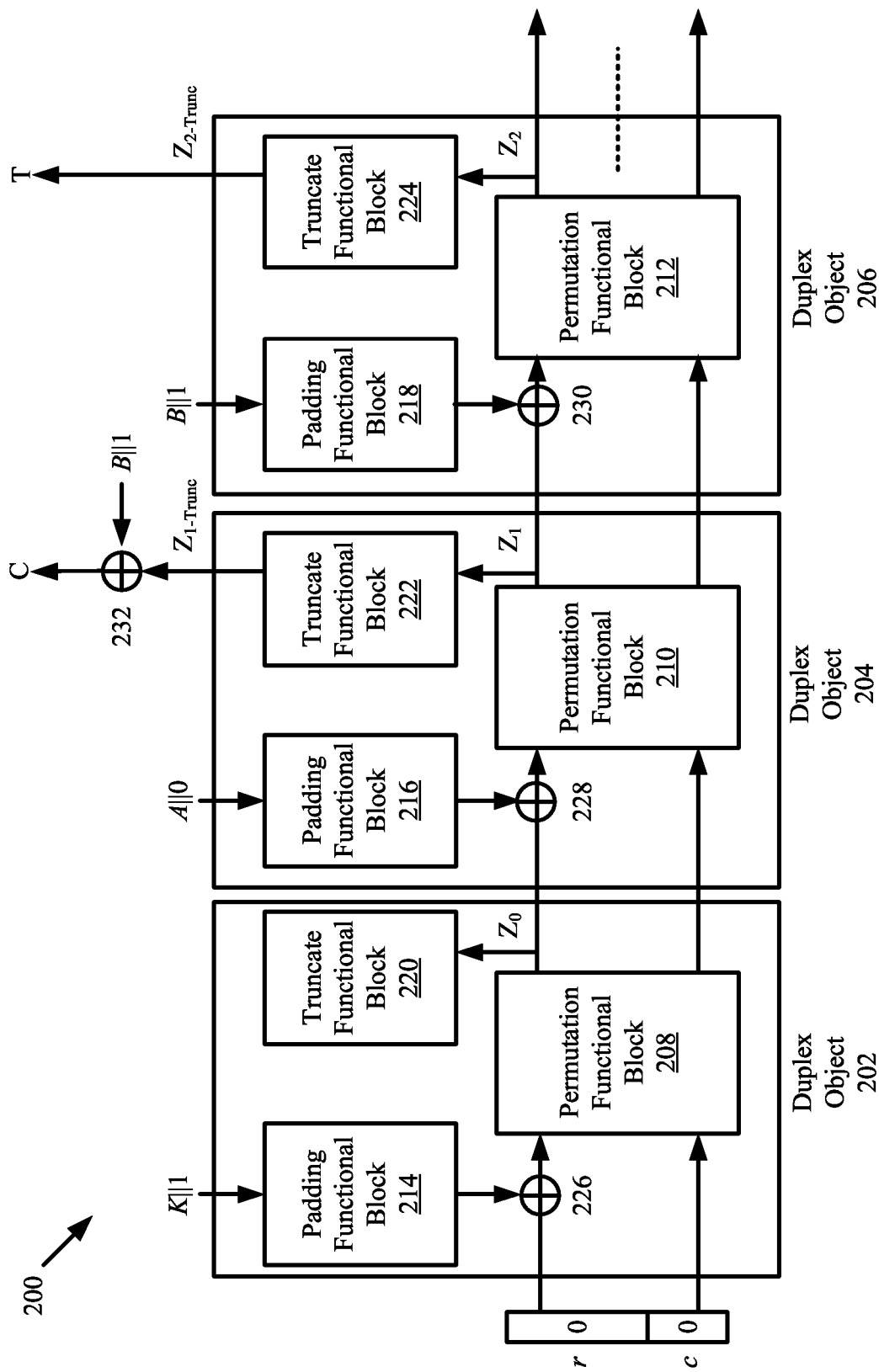

FIG. 2 provides an illustration of a duplex construction employing a unique permutation function.

Figure 3:
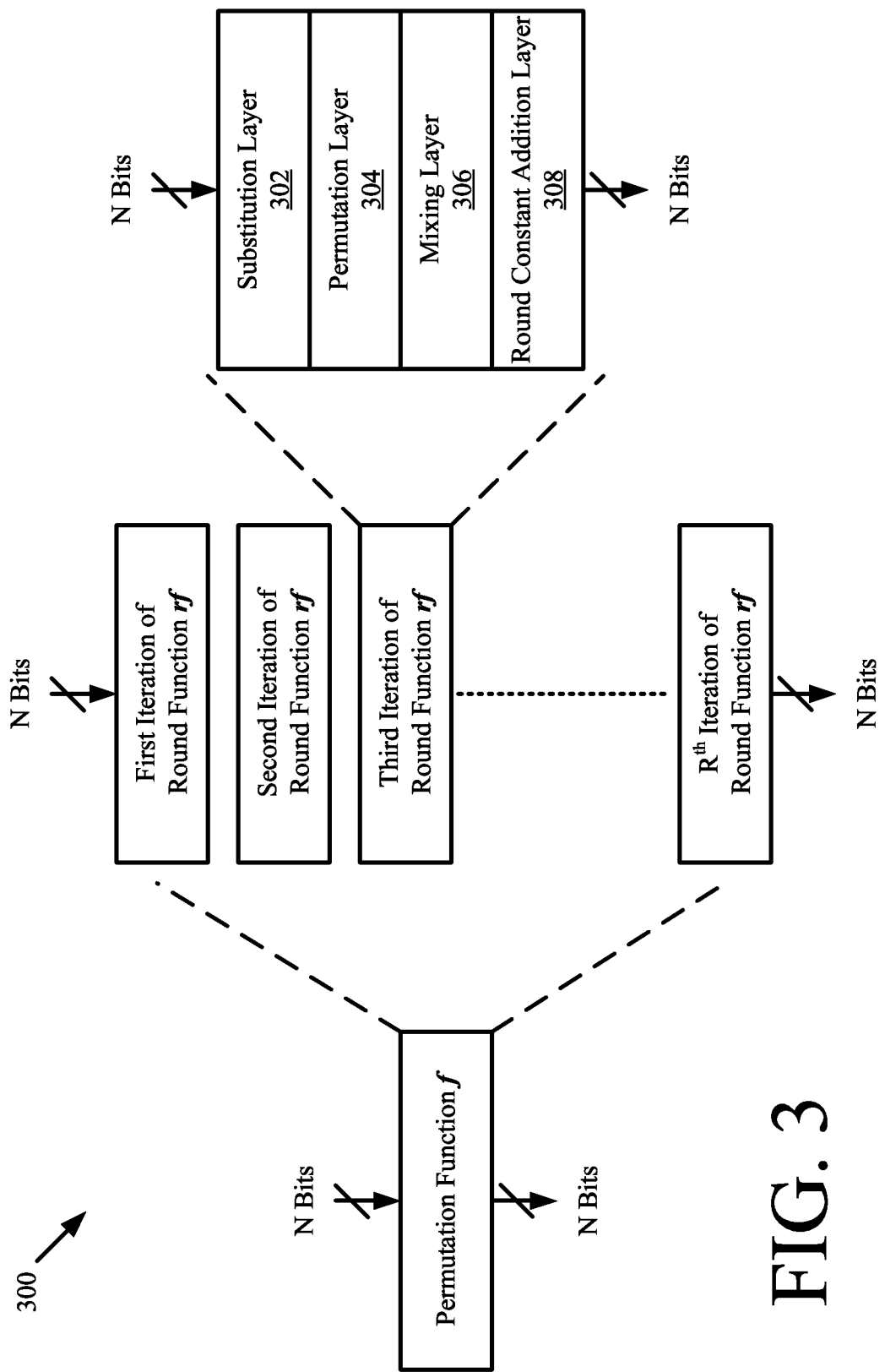

FIG. 3 provides an illustration that is useful for understanding the unique permutation function $f$.

Figure 4:
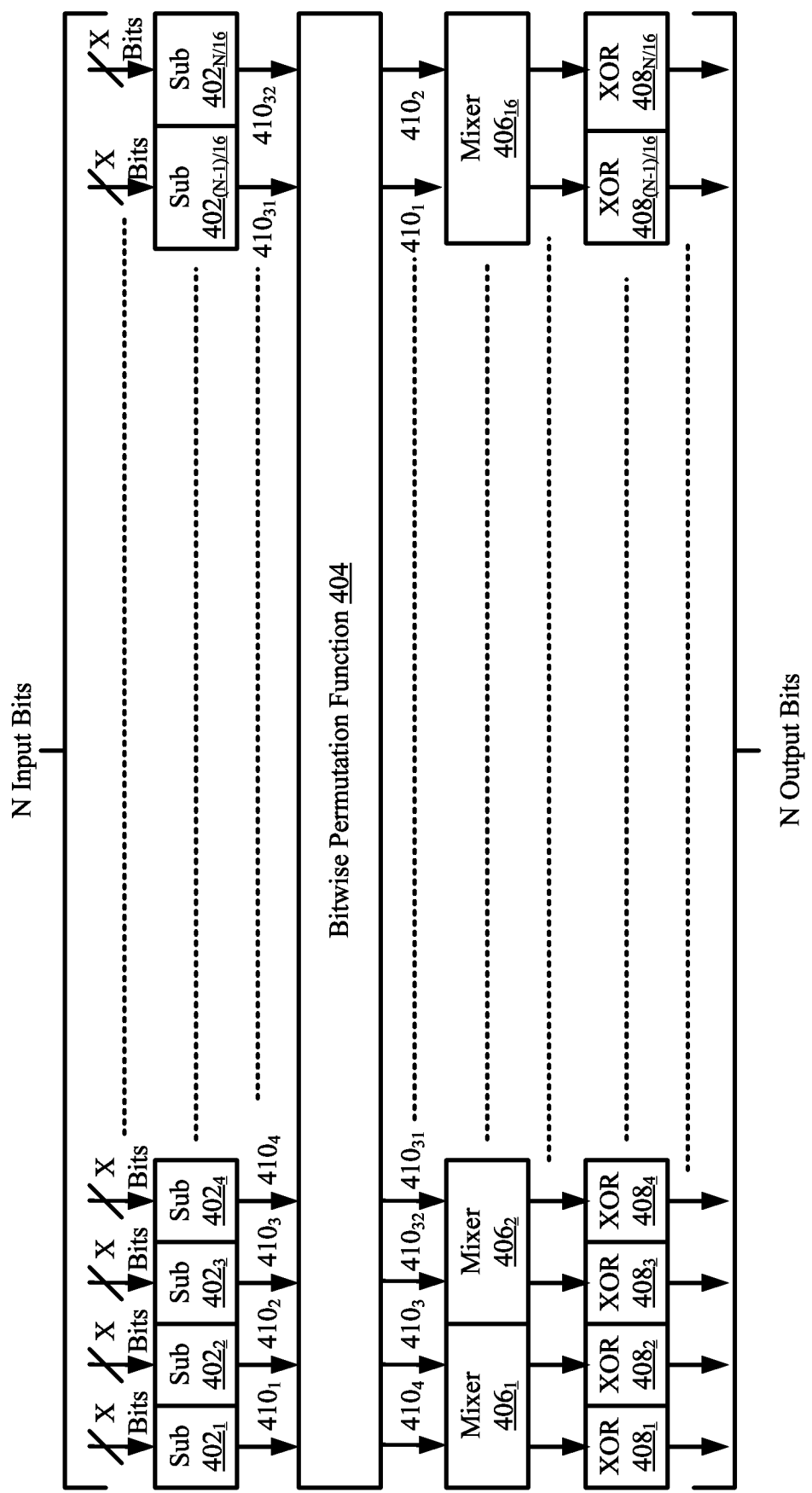

FIG. 4 provides an expanded block diagram of the round function shown in FIG. 3.

Figure 5:
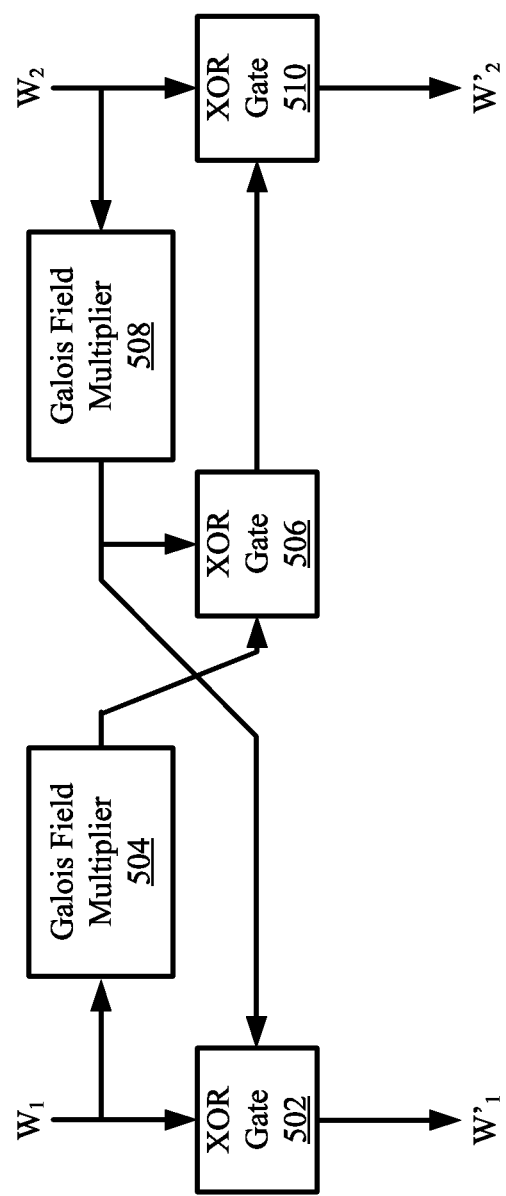

FIG. 5 provides a schematic illustration of an illustrative hardware implementation of a mixer.

Figure 6:
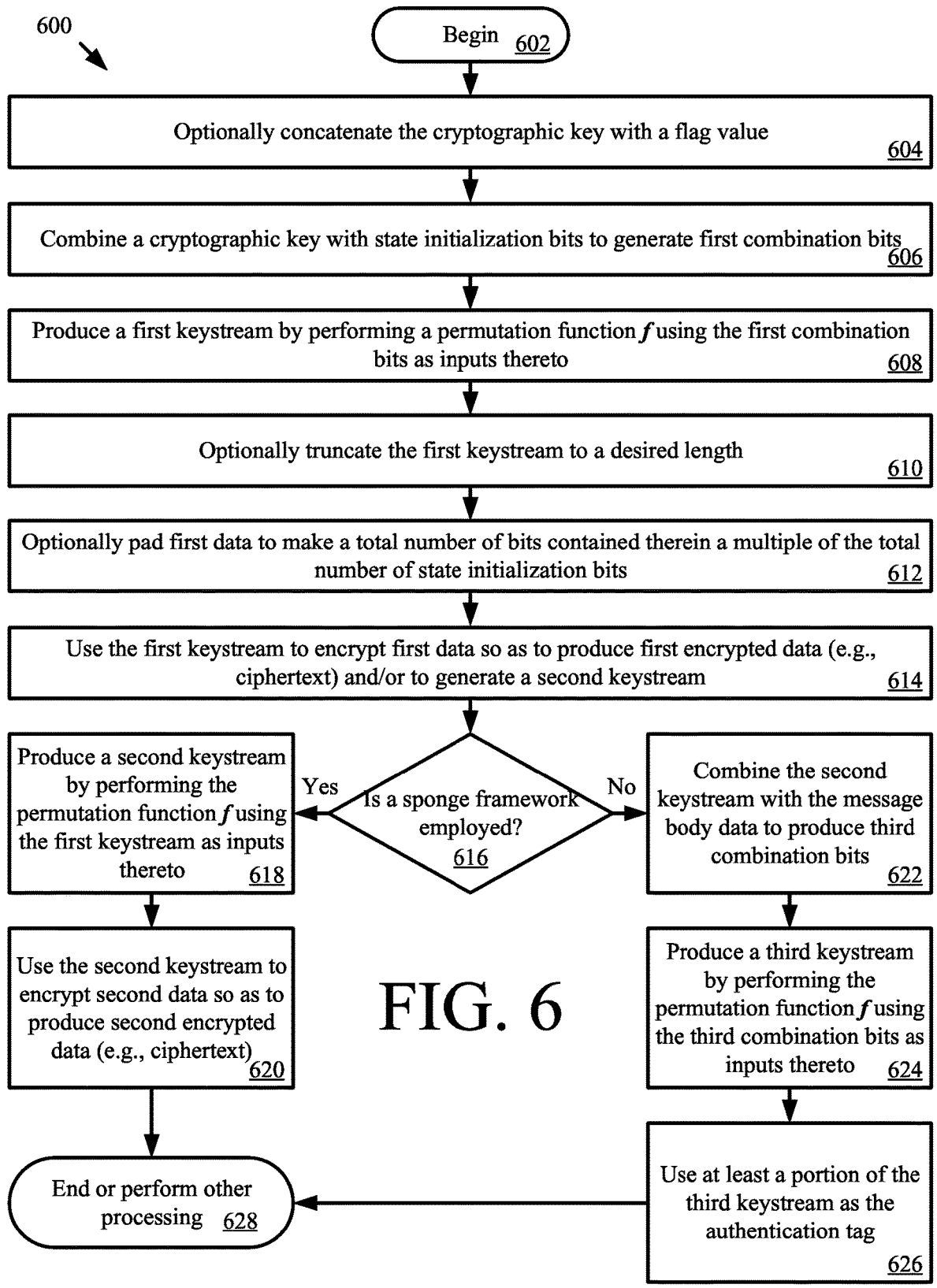

FIG. 6 provides a flow diagram of an illustrative method for generating encrypted data.

Figure 7:
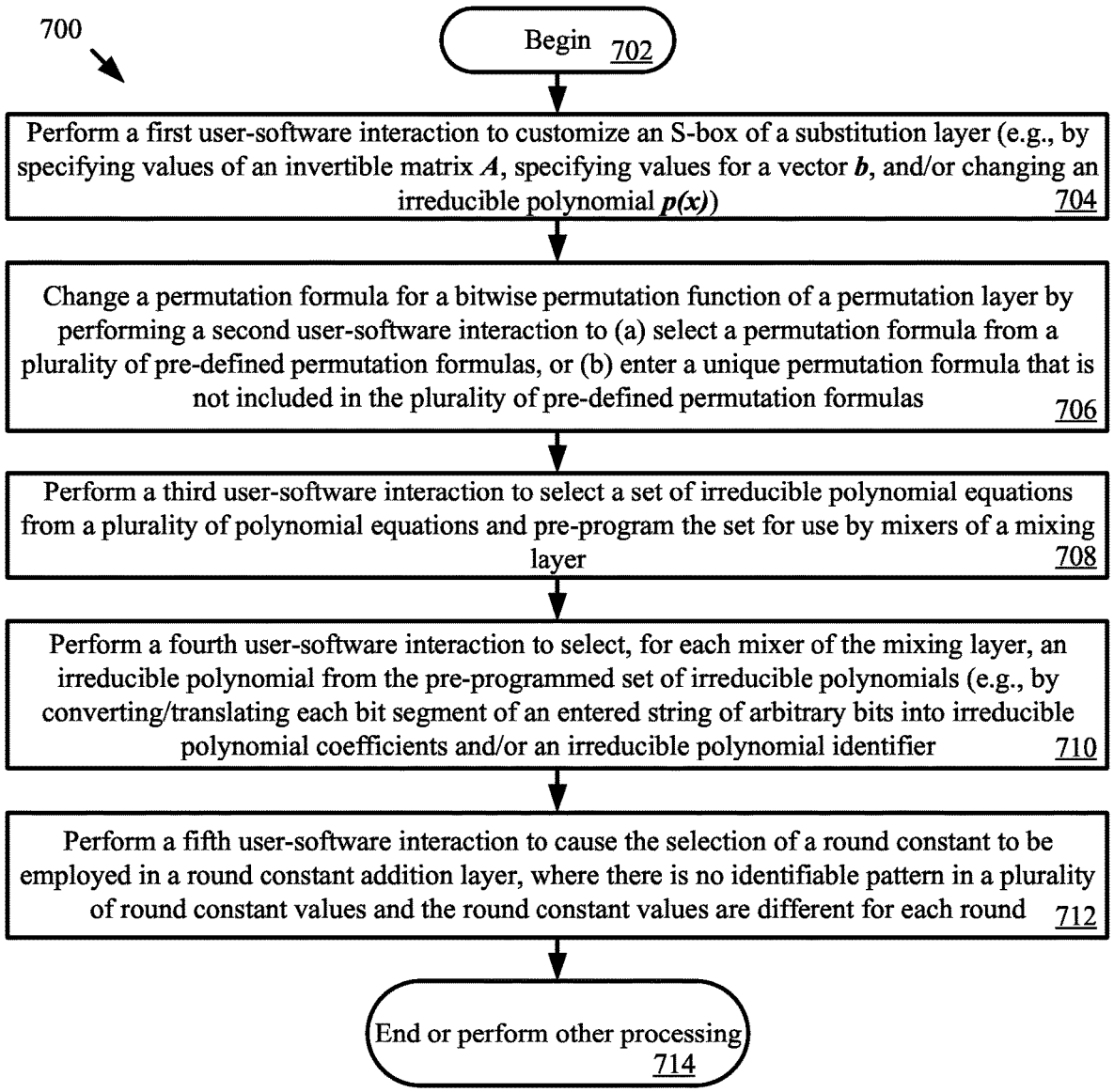

FIG. 7 provides a flow diagram of an illustrative method for customizing a permutation function $f$.

Figure 8:
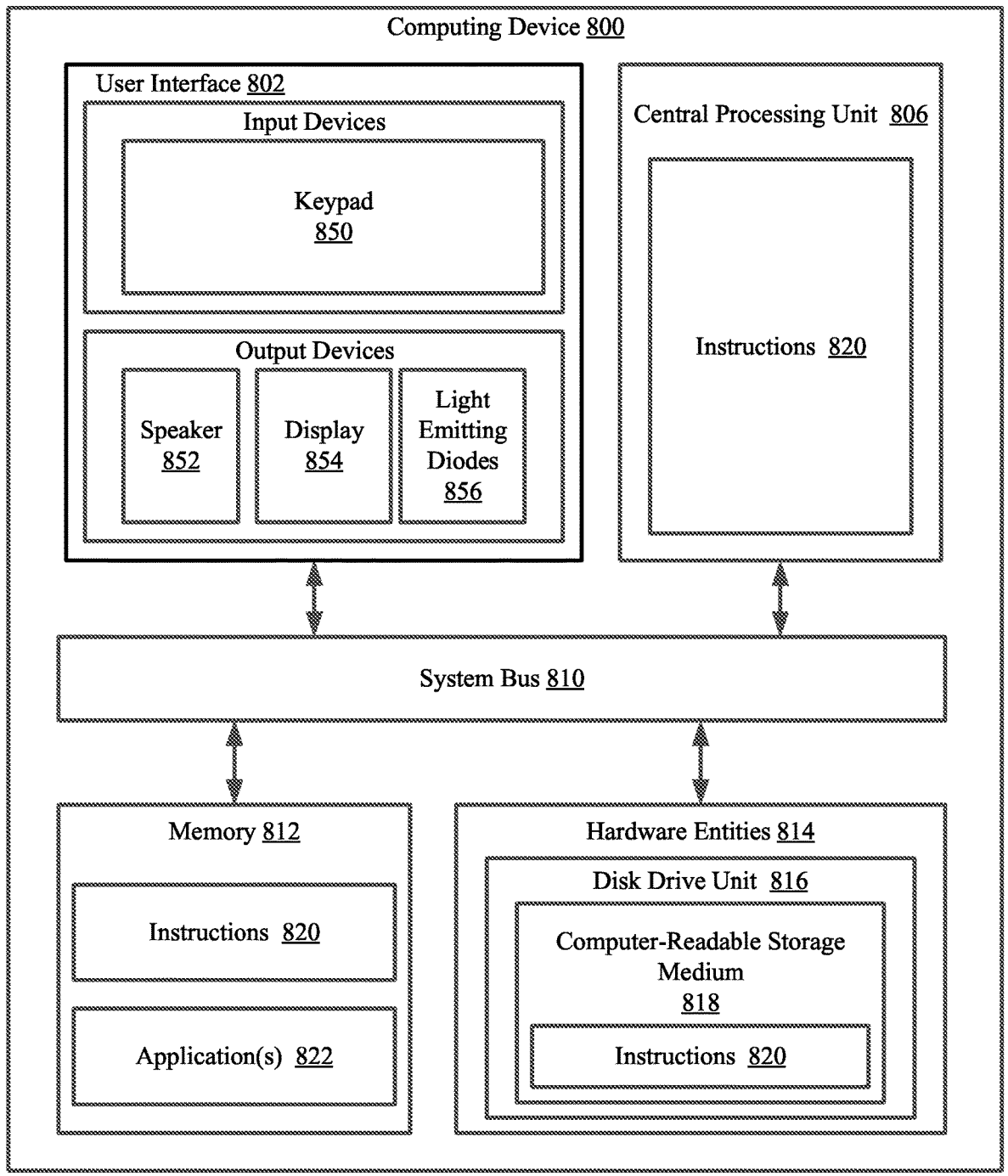

FIG. 8 provides an illustration of a computing device that can be used to customize a permutation function $f$.

Figure 9:
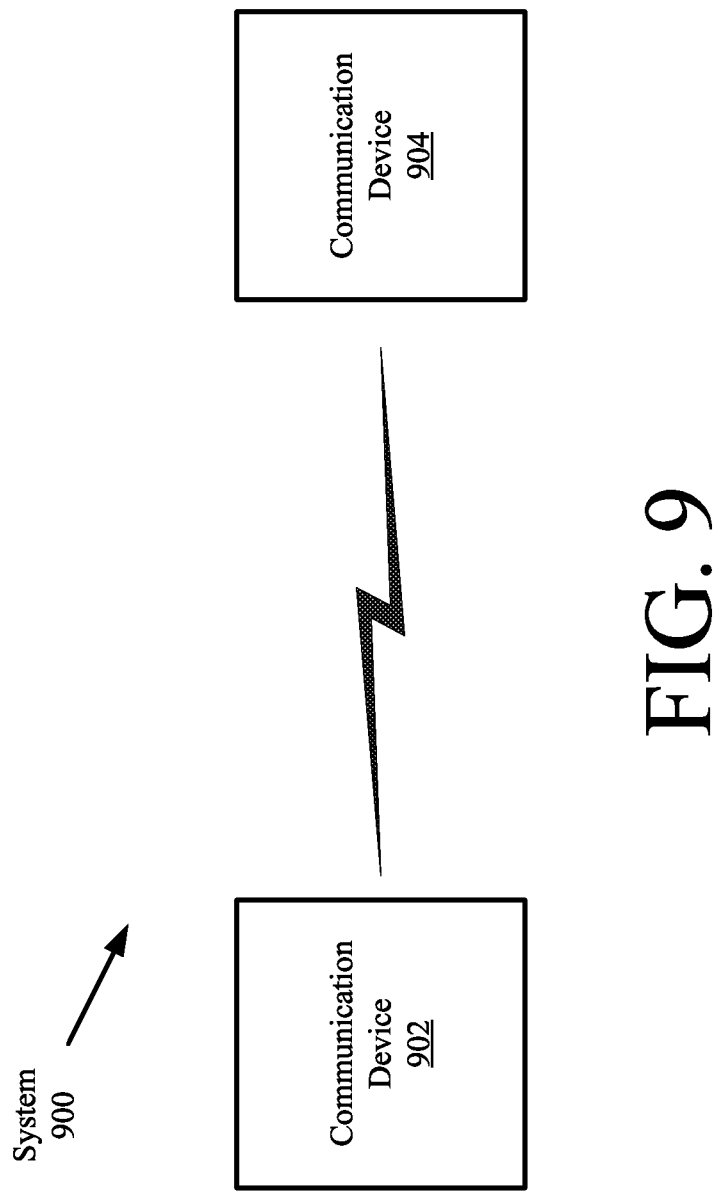

FIG. 9 provides an illustration of a system implementing the present solution.

FIGS. 10-16 each provide a more detailed diagram of a communication device configured to operate in a self-synchronization mode.

Figure 17:
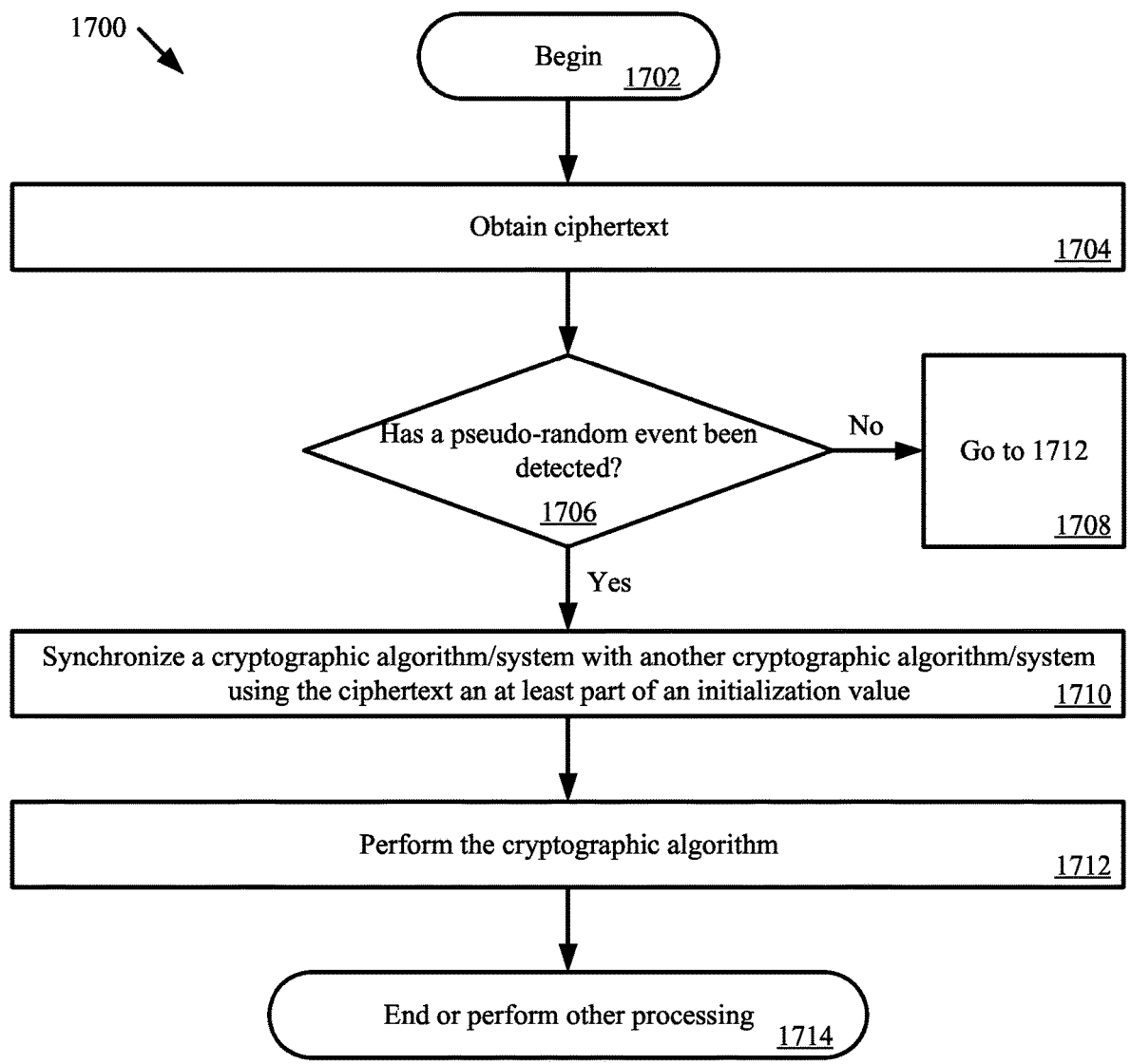

FIG. 17 provides a flow diagram of an illustrative method for operating a communication device.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present solution may be embodied in other specific forms without departing from its spirit or essential characteristics. The described embodiments are to be considered in all respects only as illustrative and not restrictive. The scope of the present solution is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present solution should be or are in any single embodiment of the present solution. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One skilled in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

Reference throughout this specification to "one embodiment", "an embodiment", or similar language means that a particular feature, structure, or characteristic described in connection with the indicated embodiment is included in at least one embodiment of the present solution. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

The present solution provides system and methods for providing cryptographic systems with a self-synchronizing mode of operation. The cryptographic systems may implement block cipher based cryptographic algorithms. The self-synchronizing mode of operation enables automatic cryptographic resynchronization between transmitters and receivers, and also enables late network entry by communication devices into an already established conversation. The self-synchronizing mode of operation provides a way for a receiver to synchronize its local cryptographic algorithm when joining a conversation for which the synchronization information and initialization variable for the cryptographic algorithm has already been sent to participants.

Based on pseudo-random events, the communication devices of a participant self-synchronize their cryptographic algorithms during the conversation. The pseudo-random events are based on the ciphertext being transmitted because the ciphertext appears statistically random. Every node on the network has access to the ciphertext, and is configured to detect patterns in the ciphertext. When a pattern is detected, a node will re-initialize a state of its cryptographic algorithm using the ciphertext transmitted over the channel. The channel may include, but is not limited to, a low bit error rate channel. In this way, the nodes will access uncorrupted ciphertext and concurrently synchronize states of their cryptographic algorithms.

The block cipher cryptographic algorithms can include, but are not limited to, adaptations of sponge based cryptographic algorithms. Sponge constructions will be described herein to assist the reader with understanding the present solution. A duplex construction will be described herein to assist the reader in understanding an illustrative adaptation of sponge construction. Sponge and duplex constructions provide frameworks representing new cryptographic paradigms with many advantages including processing performance and provable computational cryptographic strength. A novel cryptographic algorithm design is described herein that is based on the sponge and duplex construction frameworks. More particularly, the novel cryptographic algorithm comprises a unique permutation function $f$ that is used with a sponge construction and/or a duplex construction. In this regard, the present solution provides the same advantages of conventional sponge and duplex constructions, as well as other additional advantages. These other additional advantages include, but are not limited to: the provision of a highly configurable and customizable cryptographic algorithm; the provision of a symmetric key algorithm that is designed against a military threat model; the provision of increased throughput suitable to support high-rate networked waveforms; and the provision of an algorithm that can be used with key lengths that are longer than the key lengths which can be used with conventional cryptographic algorithms. Longer key lengths result in a higher level of security.

For military applications, the customers desire sovereign cryptography. Sovereign cryptography provides a feature called security autonomy where the customers have their own variant of a cryptographic algorithm. One way to obtain security autonomy is for the customers to specify their own cryptographic algorithm to be implemented in the device(s). This solution is not economically feasible. As such, the present solution provides a proprietary cryptographic algorithm that can be customized in various ways. The customization capability mainly lies in two types of customization, namely factory customization and field customization.

Factory customization is more substantial in terms of changing the cryptographic algorithms structure and adding new algorithm blocks, but also requires one to have the requisite expertise. One disadvantage of factory customization is that human error can cause degradation of the cryptographic system. This disadvantage is addressed by the present solution. In this regard, the present solution employs a cryptographic (e.g., encryption and/or decryption) algorithm that can be customized without any degradation to the security thereof. Another disadvantage is that some customers do not want others (i.e., the people with the requisite expertise) to have knowledge of their own variant of a cryptographic algorithm. The present solution also addressing this disadvantage by providing a cryptographic algorithm that can be customized in the field.

Field customization allows customers to make changes to the cryptographic algorithm via a tool after the device is provided to them. All possible information that can be input into the system via the tool to provide the field customization are equally valid in terms of not degrading the cryptographic strength of the cryptographic algorithm.

Accordingly, the present solution has two levels of customization. A first Custom Crypto ("CC") capability allows customized versions of the sponge based cryptographic algorithm to be embedded in a device (e.g., a handheld radio) at the factory. There are a number of CC settings that are specified for a custom version of the sponge based cryptographic algorithm, after an analysis to ensure that it is secure. The CC settings are stored and loaded into the encryption/decryption circuitry at power-on. The CC capability can be implemented in a substitution layer, a permutation layer and/or a round constant addition layer of a permutation function $f$, as discussed below.

A second Custom Algorithm Modification ("CAM") capability allows a user to customize the encryption/decryption algorithm in the field after power-on (i.e., after the device employing the cryptographic algorithm has been provided to the customer). CAM settings are stored in an N-bit (e.g., 128 bit) register that can be changed at any time (except during encryption/decryption). All possible CAM register values must yield different, fully secure customized algorithms. CAM is implemented in a mixer layer of the permutation function $f$. The CC and CAM capabilities will be described in detail below.

The present solution also has the following additional advantages: increased processing performance and provable computational cryptographic strength; cost effective alternative to embedded sovereign cryptography; includes cryptographic constructs and key lengths to provide post quantum security in a reasonable hardware and software footprint; and designed against a military threat model.

Referring now to FIG. 1, there is provided a schematic illustration of an illustrative architecture for a sponge construction 100 implementing the present solution. Notably, the sponge construction 100 uses a unique permutation function $f$ (described below) to provide the traditional suite of cryptographic modes. This will become more evident as the discussion progresses.

As shown in FIG. 1, the sponge construction 100 is generally designed to implement symmetric cryptography functionalities, namely key derivation and message encryption/decryption. The sponge construction 100 is a simple iterated construction for building a function F based on a unique permutation function $f$. The function F has a variable-length input and an arbitrary output length. The unique permutation function $f$ operates on a state of b=r+c bits, where r (e.g., 128 bits) is the bitrate and c (e.g., 384 bits) is the capacity. The capacity c determines the security level of the sponge construction.

Notably, the sponge construction 100 can be implemented in hardware, software or a combination of both hardware and software. As such, the operations of each functional block 102-106 may be implemented using hardware and/or software. The hardware can include, but is not limited to an electronic circuit. The electronic circuit can include passive components, active components and logical components.

The sponge construction 100 is divided into two phases. The first phase is an absorbing phase 120 in which the cryptographic key K or K∥N (i.e., a concatenation of the cryptographic key K and a flag N) is absorbed into a state of the sponge construction 100 while interleaving with applications of the underlying permutation function $f$. Such absorption is achieved by combining K (or K∥N) with the first r bits of the initialized state bits b. In some scenarios, the bits b (e.g., 512 bits) are initialized to zero. The present solution is not limited in this regard. The bits b (e.g., 512 bits) may alternatively be initialized to any bit value (e.g., any 512 bit value). As such, each user could generate its own unique value to set during the initialization phase.

The combining of K (or K∥N) with the first r bits of the initialized state can be achieved via exclusive OR ("XOR") operations 110, as shown in FIG. 1. XOR operations are well known in the art, and therefore will not be described in detail here. Still, it should be understood that the XOR operations are performed on a bit-by-bit basis. The result of each XOR operation is true whenever an odd number of inputs are true and false whenever an even number of inputs are true. The results of the XOR operations are then passed to permutation functional block 102 where the results are interleaved with applications of the unique permutation function $f$.

The second phase is a squeezing phase 122 in which keystream blocks $Z_0$, $Z_1$, $Z_2$ are produced by the performance of the unique permutation function $f$ in permutation functional blocks 102-106. Each keystream block $Z_0$, $Z_1$, $Z_2$ comprises r bits. The unique permutation function $f$ will be described in detail below. Still, it should be understood that the permutation function $f$ maps each possible value of the bits input thereto into a particular unique value of the output bits. Notably, permutation functional block 102 takes the output of the absorbing phase 120 as an input. Permutation functional block 104 takes the output of permutation functional block 102 as an input. Permutation functional block 106 takes the output of permutation functional block 104 as an input.

Next, the keystream blocks $Z_0$, $Z_1$, $Z_2$ are used to encrypt a message M. In this regard, the keystream blocks $Z_0$, $Z_1$, $Z_2$ can be truncated to a desired length l. Additionally or alternatively, the message M may be padded to make it a multiple of r (if it is not a multiple of r). The message M is parsed into a plurality of message blocks $M_0$, $M_1$, $M_2$. Each message block $M_0$, $M_1$, $M_2$ comprises a plurality of bits of the message M. Each keystream block is then combined with a respective message block so as to produce an encrypted data block. The encrypted data block can include, but is not limited to, a ciphertext block $C_0$, $C_1$ or $C_2$. The present solution is described herein in relation to ciphertext. The present solution is not limited in this regard. The present solution can be used to encrypt any type of data (e.g., text, audio, video, etc. . . . ).

In some scenarios, the combining of the keystream and message blocks is achieved using modular arithmetic. For example, each keystream block $Z_0$, $Z_1$, $Z_2$ is combined with a respective block of message bits $M_0$, $M_1$, $M_2$ via modulo 2 addition. The modulo 2 addition can be implemented using an XOR operation, as shown in FIG. 1. The XOR operation is performed on a bit-by-bit basis. As such, a first bit $m_0$ of a message block $M_0$, $M_1$ or $M_2$ is combined with a first bit $z_0$ of a respective keystream block $Z_0$, $Z_1$ or $Z_2$ via modulo 2 addition. Next, a second bit $m_1$ of a message block $M_0$, $M_1$ or $M_2$ is combined with a first bit $z_1$ of a respective keystream block $Z_0$, $Z_1$ or $Z_2$ via modulo 2 addition, and so on.

Referring now to FIG. 2, there is provided a schematic illustration of an illustrative architecture for a duplex construction 200 implementing the present solution. The duplex construction 200 is an adaptation of the sponge construction framework that, together with the unique permutation function $f$ (described below), provides an additional Authenticated Encryption ("AE") cryptographic mode. This mode allows both source and integrity verification of encrypted traffic. This will become more evident as the discussion progresses.

Notably, the duplex construction 200 can be implemented in hardware, software or a combination of both hardware and software. As such, the operations of each component 202-232 may be implemented using hardware and/or software. The hardware can include, but is not limited to an electronic circuit. The electronic circuit can include passive components, active components and logical components.

In the duplex construction 200, the absorbing phase and squeezing phase are combined into each of a plurality of duplex operations. Accordingly, the duplex construction 200 comprises a plurality of duplex objects 202-206. The operations of each duplex object will be described separately below. Notably, the state of each duplex object call is preserved.

The input to duplex object 202 is a cryptographic key K (or optionally K∥1, i.e. a concatenation of the cryptographic key K and a flag 1). The cryptographic key K (or optionally K∥1) is padded in padding functional block 214 to make it a multiple of r (if it is not a multiple of r). The padding can involve appending bits to the beginning or end of the cryptographic key K (or optionally K∥1). Next, the output of padding functional block 214 is then combined at 226 with the first r bits of the initialized state bits b. In some scenarios, the bits b are initialized to zero, where b=r+c. The present solution is not limited in this regard. The bits b (e.g., 512 bits) may alternatively be initialized to any bit value (e.g., a 512 bit value). As such, each user could generate its own unique value to set during the initialization phase.

The combining of the padding functional block output and the first r bits of the initialized state can be achieved via XOR operations 226, as shown in FIG. 2. XOR operations are well known in the art, and therefore will not be described in detail here. Still, it should be understood that the XOR operations are performed on a bit-by-bit basis. The results of the XOR operations are then passed to permutation functional block 208. In permutation functional block 208, the unique permutation function $f$ is performed using the results of the XOR operations as inputs so as to generate a keystream block $Z_0$. The keystream block $Z_0$ is then truncated to a desired length l, as shown by truncate functional block 220. The value of l here can be less than r.

The input to duplex object 204 is authentication data A (or optionally A∥0, i.e. a concatenation of authentication data A and a flag 0). The authentication data A can include but is not limited to, authenticated packet headers. The authentication data A (or optionally A∥0) is padded in padding functional block 216 to make it a multiple of r (if it is not a multiple of r). The padding of padding functional block 216 is the same as or similar to that of padding functional block 214. Next, the output of padding functional block 216 is then combined with keystream block $Z_0$. This combining can be achieved via XOR operations 228, as shown in FIG. 2. XOR operations are well known in the art, and therefore will not be described in detail here. Still, it should be understood that the XOR operations are performed on a bit-by-bit basis. The results of the XOR operations are then passed to permutation functional block 210. In permutation functional block 210, the unique permutation function $f$ is performed so as to generate a keystream block $Z_1$. The keystream block $Z_1$ is then optionally truncated to a desired length l, as shown by truncate functional block 222. The value of l here can be less than r. Truncation may be performed when the number of bits contained in the message body B is less than r. In this case, the value of l equals the number of bits contained in the message body B. The truncated keystream block $Z_{1\text{-}Trunc}$ is output from duplex object 204.

Thereafter, the truncated keystream block $Z_{1\text{-}Trunc}$ is combined with a message body B (or optionally B∥1, i.e. a concatenation of message body B and a flag 1). The message body B can include, but is not limited to, packet payload. This combining is achieved via XOR operations 232, which produces encrypted data (e.g., ciphertext) C. The XOR operations 232 are performed on a bit-by-bit basis.

The input to duplex object 206 is message body data B (or optionally B∥1). The message body data B can include but is not limited to, packet payload data. The message body data B (or optionally B∥1) is padded in padding functional block 218 to make it a multiple of r (if it is not a multiple of r). The padding of padding functional block 218 is the same as or similar to that of padding functional blocks 214 and 216. Next, the output of padding functional block 218 is then combined with keystream block $Z_1$. This combining can be achieved via XOR operations 230, as shown in FIG. 2. XOR operations are well known in the art, and therefore will not be described in detail here. Still, it should be understood that the XOR operations are performed on a bit-by-bit basis. The results of the XOR operations are then passed to permutation functional block 212. In permutation functional block 212, the unique permutation function $f$ is performed so as to generate a keystream block $Z_2$. The keystream block $Z_2$ is then optionally truncated to a desired length l, as shown by truncate functional block 224. The value of l here can be less than r. The truncated keystream block $Z_{2\text{-}Trunc}$ is output from duplex object 204. The truncated keystream block $Z_{2\text{-}Trunc}$ is then used as an authentication tag T.

In a communications scenario, the encrypted data (e.g., ciphertext) C and the authentication tag T would be transmitted from a source communication device to a destination communication device. The cryptographic key K would not be transmitted since it would be known by both devices.

The advantages of the duplex construction 200 are that: a single cryptographic key is required; encryption and authentication requires only a single pass; intermediate tags are supported thereby; additional authentication data (e.g., packet headers) is supported thereby; it is secure against generic attacks; and the ability to trade off speed and security by adjusting the value of r.

Referring now to FIG. 3, there is provided a schematic illustration that is useful for understanding the unique permutation function $f$ of the present solution which is employed in the sponge and duplex constructions described above in relation to FIGS. 1-2. The permutation function $f$ supports any key size (e.g., 128 bits or 256 bits) and is bijective. Since the permutation function $f$ is bijective, $f^1$ (inverse of) exists by definition. While $f^1$ is not used in practice, it may be helpful for cryptanalysis and verification purposes. Notably, the number of bits that are input and/or output from the permutation function $f$ is also customizable.

The permutation function $f$ comprises a round function $f_{round}$ that is iterated R times, depending on the key size. The round function $f_{round}$ consists of the following layers: a substitution layer 302; a permutation layer 304; a mixing layer 306; and a round constant addition layer 308. In the substitution layer 302, the bits input thereto are substituted with first substitute bits in accordance with a particular transformation and/or mapping algorithm. For example, input bits 010001 are substituted with bits 1010. The number of bits input/output to/from the substitution layer 302 can be the same or different. In the permutation layer 304, the bits input thereto are re-arranged. In the mixing layer 306, at least two outputs of the permutation layer are combined together. In the round constant addition layer 308, a constant is added to the output of the mixing layer. The manners in which the operations of each layer 302-308 are achieved will be discussed in detail below.

Notably, R is an integer which has a value large enough to resist differential attacks, linear attacks and other attacks depending on the cryptographic key size (e.g., R=10 for a 128 bit key or R=16 for a 256 bit key). In this regard, R is a customizable element of the permutation function $f$. In some scenarios, R is determined by (1) calculating the number of rounds needed for linear and differential cryptanalysis and (2) adding some buffer to increase the security margin.

Referring now to FIG. 4, there is provided an expanded block diagram of the round function $f_{round}$. The substitution layer 302 comprises a plurality of identical substitution boxes (or S-boxes) 402₁, 402₂, 402₃, 402₄, . . . , 402_{(N-1)/16}, 402_{N/16} which collectively receive N input bits (e.g., 512 input bits) and individually receive X bits of the N input bits (e.g., 16 bits of 512 input bits). The value of N is selected to be large enough to keep a cryptographic key secure. For example, the value of N is selected to be 512 bits for a cryptographic key having a size of 128 bits or 256 bits.

The purpose of the S-boxes is to perform substitution so as to obscure the relationship between the cryptographic key and encrypted data (e.g., ciphertext). S-boxes are well known in the art, and therefore will not be described in detail herein. Any known or to be known S-box can be used herein without limitation provided that the following properties are satisfied thereby.

(1) The S-boxes have small differential probabilities.
(2) The S-boxes have small linear approximation biases.
(3) The S-boxes have a customizable number of input bits X.
(4) The S-boxes have customizable mapping functions.

For example, each S-box 402₁, 402₂, 402₃, 402₄, . . . , 402_{(N-1)/16}, 402_{N/16} comprises an X-bit-to-X-bit S-box or an X-bit-by-Y-bit S-box, where X is a customizable integer and Y is a customizable integer different from X. The S-boxes can be implemented as look-up tables or in hardware using logical gates (e.g., XOR gates and AND gates). The look-up tables can be fixed or dynamically generated using the cryptographic key.

In some scenarios, each S-box comprises a bijective 16-bit-to-16-bit S-box. An illustrative architecture for such an S-box is described in Appendix C of a document entitled "Large Substitution Boxes with Efficient Combinational Implementations" which was written by Wood and published in August 2013. Each S-box of the substitution layer 302 is computed by the following mathematical equation.

$$S(x) = A \cdot x^{-1} + b$$

where x is a multi-bit input (e.g., a 16 bit input), A is a multi-bit invertible matrix (e.g., a 16×16-bit invertible matrix), and b is a multi-bit matrix (e.g., a 16 bit matrix). Input x is an element of a finite field $GF(2^{16})/p(x)$, where $p(x)$ is the irreducible polynomial $x^{16}+x^5+x^3+x+1$. $x^{-1}$ is then treated as a 16-bit vector, and the affine transformation $A \cdot x^{-1} + b$ is computed yielding a 16-bit output $S(x)$.

In this regard, the input to the S-box is represented as a 16-bit column vector $x = (x_{15} \ x_{14} \ldots x_1 \ x_0)^T$, $x_{15}$ is the most significant bit. Using this notation, the forward S-box function is re-written as follows.

$$S(X) = \begin{bmatrix} 0 & 0 & 1 & 0 & 0 & 0 & 0 & 1 & 0 & 0 & 1 & 1 & 1 & 1 & 1 & 0 \\ 1 & 1 & 0 & 0 & 0 & 0 & 0 & 1 & 0 & 1 & 1 & 0 & 1 & 0 & 1 & 0 \\ 1 & 1 & 0 & 0 & 1 & 0 & 1 & 1 & 0 & 1 & 0 & 1 & 0 & 0 & 1 & 1 \\ 1 & 1 & 1 & 0 & 0 & 0 & 1 & 0 & 0 & 1 & 1 & 0 & 0 & 0 & 0 & 0 \\ 1 & 1 & 0 & 0 & 0 & 1 & 1 & 0 & 0 & 1 & 1 & 1 & 1 & 0 & 1 & 1 \\ 0 & 1 & 0 & 0 & 0 & 0 & 1 & 1 & 0 & 1 & 1 & 1 & 1 & 1 & 0 & 1 \\ 0 & 0 & 1 & 0 & 1 & 0 & 1 & 0 & 1 & 1 & 0 & 0 & 1 & 1 & 0 & 0 \\ 1 & 0 & 1 & 1 & 1 & 0 & 1 & 1 & 0 & 0 & 0 & 1 & 0 & 1 & 1 & 1 \\ 0 & 1 & 0 & 0 & 0 & 0 & 0 & 1 & 0 & 0 & 1 & 1 & 1 & 0 & 1 \\ 1 & 0 & 1 & 1 & 0 & 0 & 0 & 1 & 0 & 0 & 1 & 0 & 1 & 0 & 0 & 0 \\ 1 & 0 & 1 & 0 & 0 & 1 & 1 & 1 & 0 & 0 & 1 & 1 & 0 & 1 & 0 & 0 \\ 1 & 0 & 1 & 1 & 1 & 0 & 1 & 1 & 1 & 1 & 0 & 1 & 1 & 0 & 0 & 1 \\ 1 & 0 & 1 & 0 & 0 & 1 & 0 & 1 & 1 & 0 & 0 & 1 & 0 & 0 & 0 & 1 \\ 0 & 1 & 0 & 0 & 0 & 1 & 1 & 1 & 1 & 0 & 0 & 0 & 0 & 0 & 0 & 1 \\ 1 & 0 & 0 & 0 & 1 & 1 & 0 & 1 & 0 & 1 & 1 & 1 & 1 & 0 & 0 & 0 \\ 1 & 1 & 0 & 1 & 0 & 1 & 1 & 0 & 1 & 0 & 0 & 1 & 1 & 0 & 0 & 0 \end{bmatrix} \begin{pmatrix} x_{15} \\ x_{14} \\ x_{13} \\ x_{12} \\ x_{11} \\ x_{10} \\ x_9 \\ x_8 \\ x_7 \\ x_6 \\ x_5 \\ x_4 \\ x_3 \\ x_2 \\ x_1 \\ x_0 \end{pmatrix}^{-1} \oplus \begin{pmatrix} 0 \\ 1 \\ 0 \\ 0 \\ 0 \\ 1 \\ 0 \\ 1 \\ 1 \\ 0 \\ 1 \\ 1 \\ 0 \\ 1 \\ 1 \\ 1 \end{pmatrix}$$

The inverse of the S-box function is defined by the following mathematical equation.

$$S^{-1}(Y) = \begin{bmatrix} 0 & 1 & 0 & 1 & 0 & 1 & 1 & 1 & 0 & 0 & 1 & 0 & 0 & 0 & 0 & 1 \\ 1 & 1 & 0 & 1 & 0 & 0 & 1 & 0 & 1 & 0 & 1 & 1 & 1 & 1 & 0 & 1 \\ 1 & 0 & 1 & 1 & 1 & 1 & 0 & 1 & 0 & 1 & 1 & 0 & 0 & 0 & 0 & 0 \\ 0 & 0 & 1 & 0 & 1 & 1 & 1 & 0 & 1 & 0 & 1 & 1 & 1 & 0 & 1 & 0 \\ 1 & 1 & 1 & 1 & 1 & 0 & 0 & 0 & 1 & 0 & 0 & 0 & 0 & 1 & 0 & 0 \\ 0 & 0 & 0 & 1 & 0 & 1 & 0 & 0 & 0 & 0 & 1 & 1 & 1 & 1 & 1 & 1 \\ 1 & 0 & 1 & 0 & 0 & 0 & 0 & 0 & 0 & 1 & 1 & 0 & 1 & 0 & 1 & 1 \\ 0 & 0 & 1 & 0 & 1 & 1 & 1 & 0 & 0 & 1 & 0 & 1 & 1 & 1 & 1 & 0 \\ 0 & 0 & 0 & 0 & 0 & 0 & 1 & 0 & 0 & 0 & 1 & 0 & 0 & 0 & 1 & 0 \\ 1 & 1 & 1 & 0 & 0 & 1 & 1 & 1 & 1 & 0 & 1 & 1 & 1 & 0 & 0 & 0 \\ 0 & 1 & 1 & 0 & 1 & 1 & 1 & 1 & 0 & 0 & 1 & 0 & 1 & 1 & 1 & 1 \\ 1 & 0 & 0 & 1 & 1 & 0 & 0 & 0 & 1 & 0 & 0 & 1 & 1 & 0 & 1 & 1 \\ 1 & 0 & 0 & 0 & 0 & 1 & 0 & 1 & 1 & 1 & 0 & 0 & 1 & 0 & 1 & 0 \\ 1 & 0 & 0 & 0 & 0 & 1 & 1 & 1 & 1 & 1 & 0 & 1 & 1 & 1 & 1 & 1 \\ 1 & 1 & 1 & 0 & 0 & 1 & 1 & 0 & 1 & 0 & 0 & 1 & 1 & 1 & 1 & 1 \\ 0 & 1 & 0 & 0 & 1 & 0 & 1 & 0 & 1 & 0 & 0 & 1 & 0 & 0 & 0 & 1 \end{bmatrix} \begin{pmatrix} y_{15} \\ y_{14} \oplus 1 \\ y_{13} \\ y_{12} \\ y_{11} \\ y_{10} \oplus 1 \\ y_9 \\ y_8 \oplus 1 \\ y_7 \oplus 1 \\ y_6 \\ y_5 \oplus 1 \\ y_4 \oplus 1 \\ y_3 \\ y_2 \oplus 1 \\ y_1 \oplus 1 \\ y_0 \oplus 1 \end{pmatrix}^{-1}$$

The above-described S-box can be implemented in hardware using 1238 XOR gates and 144 AND gates.

The S-box is customizable by changing the polynomial p(x). The polynomial can be changed by inputting a new polynomial or selecting a polynomial from a plurality of pre-programmed polynomials. In the latter case, the polynomial can be randomly selected from the plurality of pre-programmed polynomials. The random selection can be achieved in accordance with a chaotic, random or pseudo-random number algorithm. Chaotic, random and pseudo-random number algorithms are well known in the art, and therefore will not be described herein. Any known or to be known chaotic, random or pseudo-random number algorithm can be used herein without limitation.

Additionally or alternatively, the S-box is customizable by specifying values of the invertible matrix A and/or the vector b, such that the S-box meets the following criteria.

Input values of the S-box and the output values of the S-box are all different, where S(x)=x.

No output value is equal to the corresponding input value.

No output value is a bitwise complement of the corresponding input value.

Maximum differential probability of $2^{-14}$ or smaller. (Meaning that in theory the amount of work one must do to determine the mapping from input values to output values of the S-box is significantly greater than the time needed for a brute force determination of the key in a given number of rounds.)

Maximum linear bias of $2^{-8}$ or smaller. (Meaning that in theory an attack based on the linear bias of the S-box is not going to be successful if the linear bias has a value less than or equal to $2^{-8}$.)

The above-listed criteria are considered to provide a relatively strong cryptographic algorithm in which standard classical attacks are unlikely to be successful. Other criteria can be considered here. However, the present inventors found through significant research that the above-listed criteria provides a cryptographic algorithm with sufficient strength for military applications. These criteria advantageously address issues with key search attacks without any knowledge of the algorithms implementation and key search attacks using knowledge of at least one feature of the implemented cryptographic algorithm.

In some scenarios, the values of the invertible matrix A and/or the vector b are selected randomly. This selection is achieved by selecting values thereof in accordance with a chaotic, random or pseudo-random number algorithm. Any known or to be known chaotic, random or pseudo-random number algorithm can be used herein without limitation.

For example, in some scenarios, a user performs a user-software interaction to select at least one of a plurality of chaotic, random or pseudo-random algorithms that is to be used to generate values for the invertible matrix A and/or the vector b. The same or different algorithm can be used to generate numbers for the invertible matrix A and the vector b. The user may also enter or select values for parameters of the selected chaotic, random or pseudo-random algorithm(s). The present solution is not limited to the particulars of this example.

The present solution is also not limited to the particulars of the above discussion. In this regard, it should be understood that any S-box configuration can be employed where there is an N bit input (e.g., 16 bit) to an N bit output (e.g., 16 bit) mapping that meets the above listed criteria. For example, in other scenarios, the present solution is implemented using four 4-bit mappings, rather than one 16-bit to 16-bit mapping.

The permutation layer 304 comprises a bitwise permutation function 404. The purpose of the bitwise permutation function 404 is to permute or change a bit position of each bit $410_1, 410_2, 410_3, 410_4, \ldots, 410_{31}, 410_{32}$ input thereto relative to all other bits input thereto. Bitwise permutation functions are well known in the art, and therefore will not be described in detail herein. Any known or to be known bitwise permutation function can be used herein without limitation provided that the following properties are satisfied thereby.

(1) Each bit $410_1, 410_2, 410_3, 410_4, \ldots, 410_{31}, 410_{32}$ permutes to an output bit position different from its input bit position.

(2) All outputs of a given S-box go to X different mixers.

(3) The permutation period of the permutation function $f$ exceeds the number of rounds R.

For example, the bitwise permutation function includes a linear permutation function, an affine permutation function, or a random permutation function.

In some scenarios, the bitwise permutation function 404 comprises an affine function defined by the following mathematical equation.

$$\pi(x)=\alpha x+\beta \pmod{512}$$

where $\pi(x)$ represents the output bit position ($\pi(x) \leq 511$), $\alpha$ is an integer constant (e.g., 31), x represents the input bit position ($0 \leq x$), and $\beta$ is an integer constant (e.g., 15).

The bitwise permutation function 404 is customized by changing the permutation formula, but meeting the following criteria.

Each output bit of a given S-box must go to a different mixer's input bit.

The permutation has no fixed points, where n(x)=x (i.e., bit positions of the input bits are different than the corresponding output bit positions).

The order of each bit position must be greater than the number of rounds in the bijective function.

The listed criteria are considered to provide a relatively strong cryptographic algorithm in which standard classical attacks are unlikely to be successful. The strength of the algorithm is facilitated here by ensuring that (a) the output bit string is different from the input bit string and (b) that there are a relatively large number of bit changes between the input bit string and the output bit string. Other criteria can be considered here. However, the present inventors found through significant research that the above listed criteria provided a cryptographic algorithm with sufficient strength for military applications. These criteria advantageously address issues with key search attacks without any knowledge of the algorithms implementation and key search attacks using knowledge of at least one feature of the implemented.

A plurality of permutation formulas which meet the above criteria are described in a thesis document entitled "Design and Cryptoanalysis of a Customizable Authenticated Encryption Algorithm", written by Kelly. Any of the permutation functions mentioned in this thesis can be used herein without limitation. For example, the above-described permutation function is changed to one of the following permutation functions which meet the above criteria.

$$pi(x)=31x+15$$

$$pi(x)=31x+31$$

$$pi(x)=33x+16$$

$$pi(x)=33x+48$$

Customization can be achieved by either selecting one of a plurality of predefined and/or preprogrammed permutation functions or by allowing a customer to enter their own unique permutation formula.

The present solution is not limited to the particulars of the permutation formulas referenced above. Any permutation technique can be used here provided that the above listed three criteria are met.

The mixing layer 306 comprises a mixing function that is implemented via a plurality of mixers $406_1, 406_2, \ldots, 406_{16}$. In the scenario shown in FIG. 4, one mixer is provided for every two S-boxes. The present solution is not limited in this regard. The particular number of S-boxes per mixer is customizable. Also, the mixing function is a customizable element of the present solution. The purpose of the mixing function is to provide local diffusion (i.e., across two words) and increase the linear and differential branch numbers of a round from two to three. In this regard, mixers based on matrix multiplication in Galois Field GF($2^M$) may be employed because they satisfy all of the following constraints: the matrix is invertible in GF($2^{16}$)/<p(x)>; the matrix has a differential and linear branch number equal to three; and the transformation is efficiently implementable in hardware.

In some scenarios, operations performed by each mixer $406_1, 406_2, \ldots, 410_{16}$ is defined by the following mathematical equation.

$$p(x) = x^{16} + x^5 + x^3 + x^2 + 1$$

The mixer takes in two words $W_1$ and $W_2$ as input and produces outputs $W'_1$ and $W'_2$ as follows.

$$\begin{pmatrix} W'_1 \\ W'_2 \end{pmatrix} = \begin{pmatrix} 1 & x \\ x & x+1 \end{pmatrix} \begin{pmatrix} W_1 \\ W_2 \end{pmatrix}$$

The mixer is implementable in hardware. An illustrative hardware implementation of the mixer is provided in FIG. 5. As shown in FIG. 5, the mixer comprises XOR gates 502, 506, 510 and Galois field multipliers 504, 508. The Galois field multipliers 504, 508 perform multiplication by x in Galois field GF($2^X$).

The mixing layer 306 is customizable based on user input. As noted above, each mixer in the mixing layer 306 has two 16-bit input words $W_1$, $W_2$ and two 16-bit output words $W'_1$, $W'_2$. In the mixing layer 306, arithmetic in Galois field GF($2^{16}$)/p(x) is performed using a certain degree-16 irreducible polynomial p(x). Each 16-bit quantity is treated as a vector of coefficients of a polynomial in x, from $x^{15}$ down to $x^0$. Addition and multiplication are performed on polynomials using GF(2) arithmetic on the coefficients. Every result is reduced modulo p(x). A 128-bit CAM register setting is used to specify a particular irreducible polynomial p(x) used in each mixer. There are sixteen mixers $406_1, \ldots, 406_{16}$ so there are eight CAM register bits per mixer. The eight CAM register bits are used to select a predefined irreducible polynomial from a given pre-programmed set of irreducible polynomials (e.g., 256). In this regard, a user inputs a bit string of 128 bits (i.e., 8 bits by 16 mixers). The bit string is then processed to parse out sixteen segments each comprising eight bits. Each segment is converted or translated into irreducible polynomial coefficient values and/or an identifier for a particular irreducible polynomial of the pre-programmed set. The identifier can comprise (1) information identifying the particular irreducible polynomial and/or (2) information indicating where the particular irreducible polynomial of the pre-programmed set is stored in a data store (e.g., memory 812 of FIG. 8) local to the electronic device implementing the cryptographic algorithm. A table lookup can be used here to perform the bit-to-coefficient conversion/translation and/or the bit-to-identifier conversion/translation.

Notably, there are 4,080 different 16-degree irreducible polynomials that meet the above-listed criteria. The set of irreducible polynomials (e.g., 256) is selected at the factory from the 4,080 different 16-degree polynomials. Accordingly, a different set of irreducible polynomials (e.g., 256) can be selected for each customer to achieve customization of the cryptographic algorithm, i.e., a new set of predefined irreducible polynomials (e.g., 256) can be from the 4,080 different 16-degree polynomials for each customer.

In some scenarios, at least two of the mixers use the same irreducible polynomial, but with different coefficients. Additionally or alternatively, the bit string is entered by the user in the field. The bit string includes arbitrary bits. The user has no expertise with regard to cryptography. Still, the user is able to change the encryption/decryption algorithm without causing any degradation to the security thereof.

The round constant addition layer 308 comprises a plurality of addition operations represented by blocks $408_1$, $408_2, 408_3, 408_4, \ldots, 408_{(N-1)/16}, 408_{N/16}$. The purpose of the addition operations is to add a constant N bit value to the state using bitwise XOR in order to disrupt symmetry and prevent slide attacks. Notably, the round constant must be fixed random N-bit values. Each round i must use a different round constant. The round constant is customizable, and should be unique for each round to prevent against slide attacks and be random, pseudorandom or highly asymmetric to reduce symmetry in the state. Accordingly, the round constant addition layer 308 is customizable by simply choosing different round constants, but meeting the following criteria.

The round constants must be chosen such that there are no identifiable patterns in a plurality of round constant values.

The round constant values are different for each round. In some scenarios, at least one of the following criteria may additionally be met.

Each round constant has the same number of 0's and 1's.
Each round constant is chosen at random.

A round constant can be chosen at random in accordance with a chaotic, random or pseudo-random number algorithm. Chaotic, random and pseudo-random number algorithms are well known in the art, and therefore will not be described herein. Any known or to be known chaotic, random or pseudo-random number algorithm can be used herein without limitation.

In some scenarios, the round constant $RC_i$ for round i is given by the following mathematical equation.

$$RC_i = \text{KECCAK-N(ASCII}(i))$$

where ASCII(i) is a function that provides a one or two byte ASCII representation of round i and KECCAK-512 is the hash function that outputs an N (e.g., 512) bit message digest. The following TABLE 1 provides the values of the round constant $RC_i$ up to i=16.

TABLE 1

| Constant | Hex Value |
| --- | --- |
| $RC_1$ | 00197a4f5f1ff8c356a78f6921b5a6bfbf71df8dbd313fbc5095a55de756bfa1ea7240695005149294f2a2e419ae251fe2f7dbb67c3bb647c2ac1be05eec7ef9 |
| $RC_2$ | ac3b6998ac9c5e2c7ee8330010a7b0f87ac9dee7ea547d4d8cd00ab7ad1bd5f57f80af2ba711a9eb137b4e83b503d24cd7665399a48734d47fff324fb74551e2 |
| $RC_3$ | ce4fd4068e56eb07a6e79d007aed4bc8257e10827c74ee422d82a29b2ce8cb079fead81d9df0513bb577f3b6c47843b17c964e7ff8f4198f32027533eaf5bcc1 |
| $RC_4$ | 5058cb975975ceff027d1326488912e199b79b916ad90a3fe2fd01508cd7d7c01bc8aaa4d21a8473fb15f3b151ab9e44172e9ccb70a5ea04495af3ec03b5153e |

TABLE 1-continued

| Constant | Hex Value |
|---|---|
| $RC_5$ | 84da272d13a44f0898ee4ea53334c255d894cc54d357c55466d760debde482a2 44c128df641e80673a8bc34a1620d880b7965e549f313ddccfd506b073413b87 |
| $RC_6$ | bb93aaa23b38ea96c9346ef91e184982bf50e91033f4354ecb20d3c7390c2b41 862e8825ec3d0fee0a6f978881f90728c6748e4aed8b732350075d6c2bdd8e4b |
| $RC_7$ | fe32f3eba76626dedf36622bfdc5ccd33db2f3e0dd7c3c128298ea78c1cc7fee 1a140edb8e57cd5824c7f4b817c0fc94e70da5b9399faaf9a848a46ad30679e9 |
| $RC_8$ | 952ba02486b818febc0ec98559df27c79357838f011b1e5bc11f2cfb6fc0573e 545978c2bc5b390f44907f8da0dfd68206fe4521f86ba6c879ec1e69caed9533 |
| $RC_9$ | b41e6bb4ed20294016399c268da6bf88c89e2dc118a361b3560ee8daed973a8f 9778df40e308c1206fa42f97f3fd3f63d2b4b3b57eb5bcbec6ad64d46216b692 |
| $RC_{10}$ | 6954a418cecc43633bd526c2499dfc16b832f58b216b9a8b226a6a0b7918d364 a7939004339de0ba08e2b547e64dc5622e24b0c4f8f415d9e0a84cb94b6c5f3f |
| $RC_{11}$ | 2e4b9ad37091e3e5a218c5e57b33ed3470ba4f31fbcf16424684fdd5cde38e88 9eae3f018b37af58c24ccc8af57abc2c6911408dd20ef6435e4494a3e6599a06 |
| $RC_{12}$ | aa42aca73bd7f8a17e987f281422b266e44f0de1615d2d393c620c8c5a2c80b4 f06178c8455bf98179603f2f1bcb30b2559f282c799e40533b0665f97a2a706a |
| $RC_{13}$ | 969c39ae2dc16834310344c0579d0ffdfde01772dbf9a4cab984953c395d7791 1510f39e5f37295e3611a1d46101460daf731ddbdab1ec1bbc512edc44680d8d |
| $RC_{14}$ | 8a1e6ce31f0b526d884b584aa1a5ae4294fcf85fd2e525f959ed1a54233359c7 c5fece6d24775e7d4a9ad97c2632a3be5b331a8f580f557b269e7b65123a5992 |
| $RC_{15}$ | 9bd64a932f09672def04b6a94753a3e4087a1c3895078dc70927fcd774888dfd 400b95fd1c6a0b2a91a1ba44eea09f5163dba4dfa9da7b8eb97d791cab566437 |
| $RC_{16}$ | 48401f65c2d2d9e71fe47bd80b28d834eee8fffbe9aa4608cba33e6fedce0b1 693c80cdc36db7f504e4abea23ccc6729a030f5b3e035fb59c2c788215cf84a8 |

Notably, the present solution is suitable for implementation on Field Programmable Gate Arrays ("FPGAs"). Serial and fully parallel implementations can be used to meet area or performance constraints. The S-boxes may be implemented using composite field techniques and pipelined for higher performance. Also, the present solution can be integrated into Single Chip Crypto ("SCC") systems.

Furthermore, the present solution anticipates future security requirements. Post Quantum Security ("PQS") will become a requirement for radio product customers, as well as provable computational security and quantified theoretical security metrics and analysis processes. The present solution provides a security means that satisfies all of these requirements.

As evident from the above discussion, the present algorithm is highly customizable within a security margin. This customizability is useful in cases where different users want unique, proprietary algorithms. The following features of the present solution are customizable: (1) the state initialization; (2) the number of rounds R; (3) the permutation function $f$; (4) the number of bits N input into the round function; (5) the type, number, parameters and mapping function of the S-boxes; (6) the bitwise permutation function; (7) the mixing function; and (8) the round constants.

Referring now to FIG. 6, there is provided a flow diagram of an illustrative method 600 for generating encrypted data (e.g., ciphertext) that is useful for understanding the present solution. Method 600 begins with step 602 and continues with optional step 604. In optional step 604, a cryptographic key is concatenated with a flag value. Next in step 606, the cryptographic key is combined with state initialization bits to generate the first combination bits. A multi-bit value for the state initialization bits may be selected such that it is unique for a given application.

The first combination bits are then used to produce a first keystream, as shown by step 608. The first keystream may optionally be truncated to a desired length, as shown by step 610. The first keystream is produced using a permutation function $f$. The permutation function $f$ is performed using the first combination bits as inputs thereof. The permutation function $f$ comprises a round function $f_{round}$ that is iterated R times. The round function $f_{round}$ consists of (1) a substitution layer in which the first combination bits are substituted with substitute bits, (2) a permutation layer in which the substitute bits are re-arranged, (3) a mixing layer in which at least two outputs of the permutation layer are combined together, and (4) an addition layer in which a constant is added to the output of the mixing layer.

After completing optional step 610, method 600 continues with another optional step 612. Step 612 involves padding the first data to make a total number of bits contained therein a multiple of the total number of state initialization bits prior to being encrypted. The first data is then encrypted using the first keystream, as shown by step 614. In this regard, the first data may be combined with the first keystream using modular arithmetic (e.g., modulo 2 addition). The first data comprises, but is not limited to, authentication data and/or message body data.

If a sponge framework is employed [616:YES], then steps 618-620 are performed. Step 618 involves producing a second keystream by performing the permutation function $f$ using the first keystream as inputs thereto. Step 620 involves using the second keystream to encrypt the second data so as to produce the second encrypted data (e.g., ciphertext). Upon completing step 620, method 600 ends or other processing is performed (e.g., repeat steps 618-620 for a next block of message data), as shown by step 628.

If a duplex framework is employed [616:NO], then steps 622-626 are performed. Prior to discussing steps 622-626, it should be understood that in the duplex context the first encrypted data (e.g., ciphertext) is produced in previous step 614 by: combining the first keystream with authentication data to generate the second combination bits; producing a second keystream by performing the permutation function $f$ using the second combination bits as inputs thereto; and combining the second keystream with the message body data so as to produce the first encrypted data (e.g., ciphertext). The second keystream is also used in step 622 to produce the third combination bits. The third combination bits are input into the permutation function $f$, as shown by step 624. As a result of performing the permutation function $f$, a third keystream is produced. At least a portion of the third keystream is used as an authentication tag.

FIG. 7 is a flow diagram of an illustrative method 700 for customizing a permutation function $f$. Notably, the customization changes the permutation function $f$ without degenerating the security of the encryption/decryption algorithm.

As shown in FIG. 7 includes a plurality of blocks 704-712 to illustrate that the permutation function $f$ can be customized in various ways. FIG. 7 can be modified to eliminate any of the blocks or to show certain block as optional blocks. Also, the present solution is not limited to the order in which the blocks are shown in FIG. 7. For example, block 712 can reside before block 710.

As also shown in FIG. 7, method begins with 702 and continues with 704 where a first user-software interaction is performed to customize an S-box (e.g., S-box $402_1, \ldots,$ or $402_{N/16}$ of FIG. 4) of a substitution layer (e.g., substitution layer 302 of FIG. 3). The customization is achieved by changing a polynomial equation and/or by changing an input-to-output bit mapping, such that the S-box (1) has input values and output values that are all different, (2) does not have an output value that is equal to the corresponding input value, (3) does not have an output value that is a bitwise complement of the corresponding input value, (4) has a maximum differential probability of $2^{-14}$ or smaller, and (5) has a maximum linear bias of $2^{-8}$ or smaller. In some scenarios, the input-to-output bit mapping is changed by specifying values of at least one of a multi-bit invertible matrix A and a multi-bit vector b for the mathematical equation $S(x)=A \cdot x^{-1}+b$, where x is a multi-bit input. The values may be randomly selected in accordance with a chaotic, random or pseudo-random number algorithm. The same or different chaotic, random or pseudo-random number algorithm can be used to specify values for the multi-bit invertible matrix A and the multi-bit vector b. The first user-software interaction can be achieved using an input device (e.g., a touch screen 854 of FIG. 8, a keypad 850 of FIG. 8, a mouse, a drop down menu or any other input means) provided by a computing device (such as that shown in FIG. 8).

Next in 706, a permutation formula is changed for a bitwise permutation function of a permutation layer (e.g., permutation layer 304 of FIG. 3). This change can be achieved by performing a second user-software interaction to (a) select a permutation formula from a plurality of predefined permutation formulas, or (b) enter a unique permutation formula that is not included in the plurality of predefined permutation formulas. This change must be made such that the following criteria is met: (1) each output bit of a given S-box goes to a different mixer's input bit; (2) bit positions of bits input to the permutation layer are different than the positions of corresponding bits output from the permutation layer; and (3) an order of each bit position is greater than a number of rounds in a bijective function. The second user-software interaction can be achieved using a touch screen, a key pad, a mouse, a drop down menu or any other input means provided by a computing device (such as that shown in FIG. 8).

In 708, a third user-software interaction is performed to select a set of irreducible polynomial equations from a plurality of polynomial equations. The selected set is preprogram for possible use by mixers (e.g., mixers $406_1, \ldots, 406_{16}$ of FIG. 4) of a mixing layer (e.g., mixing layer 306 of FIG. 3). In some scenarios, each of the plurality of polynomial equations comprises a degree-16 irreducible polynomial equation.

A fourth user-software interaction is performed in 710 to select, for each mixer of the mixing layer, an irreducible polynomial p(x) from the pre-programmed set of irreducible polynomials. This selecting can be achieved by: receiving a first user-software interaction for entering a first bit string comprising a plurality of first arbitrary bits; breaking the first bit string into a plurality of equal length segments each comprising only a portion of the plurality of first bits; and converting/translating each of the equal length segments into irreducible polynomial coefficients into irreducible polynomial coefficients and/or an irreducible polynomial identifier, as described above. Thereafter, a respective mixer of the mixing layer is caused to use the irreducible polynomial coefficients and/or the identified irreducible polynomial. In some scenarios, the third user-software interaction of 708 is performed at the factory, while the fourth user-software interaction of 710 is performed in the field.

In 712, a fifth user-software interaction is performed to cause the selection of a round constant to be employed in a round constant addition layer (e.g., round constant addition layer 308 of FIG. 3). Notably, the selection is made such that (1) there is no identifiable pattern in a plurality of round constant values and (2) the round constant values are different for each round. In some scenarios, each round constant value of the plurality of round constant values has the same number of 0's and 1's, and/or is chosen at random. Subsequently, 714 is performed where method 700 ends or other processing is performed.

Referring now to FIG. 8, there is provided a detailed block diagram of an illustrative architecture for a computing device 800. The computing device 800 is generally configured to allow a cryptographic algorithm to be customized (and more particularly a permutation function $f$ as described above). In this regard, the computing device 800 implements the cryptographic algorithm and/or is able to communicate with another electronic device (e.g., a communications device, such as a handheld radio) implementing the cryptographic algorithm.

The computing device 800 may include more or less components than those shown in FIG. 8. However, the components shown are sufficient to disclose an illustrative embodiment implementing the present solution. The hardware architecture of FIG. 8 represents one embodiment of a representative server configured to facilitate inventory counts and management. As such, the computing device 800 of FIG. 8 implements at least a portion of a method for customizing a permutation function $f$.

Some or all the components of the computing device 800 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 8, the computing device 800 comprises a user interface 802, a CPU 806, a system bus 810, a memory 812 connected to and accessible by other portions of computing device 800 through system bus 810, and hardware entities 814 connected to system bus 810. The user interface can include input devices (e.g., a keypad 850) and output devices (e.g., speaker 852, a display 854, and/or light emitting diodes 856), which facilitate user-software interactions for controlling operations of the computing device 800.

At least some of the hardware entities 814 perform actions involving access to and use of memory 812, which can be a RAM, a disk driver and/or a Compact Disc Read Only Memory ("CD-ROM"). Hardware entities 814 can include a disk drive unit 816 comprising a computer-readable storage medium 818 on which is stored one or more sets of instructions 820 (e.g., software code) configured to implement one or more of the methodologies, procedures, or functions described herein. The instructions 820 can also reside, completely or at least partially, within the memory 812 and/or within the CPU 806 during execution thereof by the computing device 800. The memory 812 and the CPU 806 also can constitute machine-readable media. The term "machine-readable media", as used here, refers to a single medium or multiple media (e.g., a centralized or distributed database, and/or associated caches and servers) that store the one or more sets of instructions 820. The term "machine-readable media", as used here, also refers to any medium that is capable of storing, encoding or carrying a set of instructions 820 for execution by the computing device 800 and that cause the computing device 800 to perform any one or more of the methodologies of the present disclosure.

In some scenarios, the hardware entities 814 include an electronic circuit (e.g., a processor) programmed for facilitating the customization of a cryptographic algorithm. In this regard, it should be understood that the electronic circuit can access and run a software application 822 installed on the computing device 800. The software application 822 is generally operative to facilitate: a first user-software interaction to customize an S-box of a substitution layer by randomly specifying values of an invertible matrix A and a vector b; a second user-software interaction to (a) select a permutation formula from a plurality of predefined permutation formulas, or (b) enter a unique permutation formula that is not included in the plurality of predefined permutation formulas; a third user-software interaction to select an irreducible polynomial p(x) from a plurality of irreducible polynomials to be used in each mixer of a mixing layer; and/or a fourth user-software interaction to cause the random selection of at least one round constant to be employed in a round constant addition layer, where each bit in the selected round constant is a 0 or 1 with probability 0.5. Other functions of the software application 822 are apparent from the above discussion.

Self-Synchronizing Mode of Operation

As noted above, the present solution provides a self-synchronizing mode of operation for the cryptographic systems (such as those described above in relation to FIGS. 1-8) employing block cipher based cryptographic algorithms. The self-synchronizing mode of operation enables automatic cryptographic resynchronization between transmitters and receivers, and also enables late network entry by communication devices into an already established conversation. The self-synchronizing mode of operation provides a way for a receiver to synchronize its local cryptographic algorithm when joining a conversation for which the synchronization information and initialization variable for the cryptographic algorithm has already been sent to participants. Based on pseudo-random events, the communication devices of a participant self-synchronize their cryptographic algorithms during the conversation. The pseudo-random events are based on the ciphertext being transmitted because the ciphertext appears statistically random. Every node on the network has access to the ciphertext, and is configured to detect patterns in the ciphertext. When a pattern is detected, a node will re-initialize a state of its cryptographic algorithm using the ciphertext transmitted over the channel. The channel may include, but is not limited to, a low bit error rate channel. In this way, the nodes will access uncorrupted ciphertext and concurrently synchronize states of their cryptographic algorithms.

An illustration of an illustrative system 900 is provided in FIG. 9. As shown in FIG. 9, system 900 comprises a transmitting communication device 902 and a receiving communication device 904. The communication devices 902, 904 can include, but are not limited to, radios, smart phones, cellular phones and/or personal computers. The communication devices 902, 904 implement a self-synchronizing cipher feedback mode. The particulars of the self-synchronizing cipher feedback mode will become evident as the discussion progresses.

Figure 10:
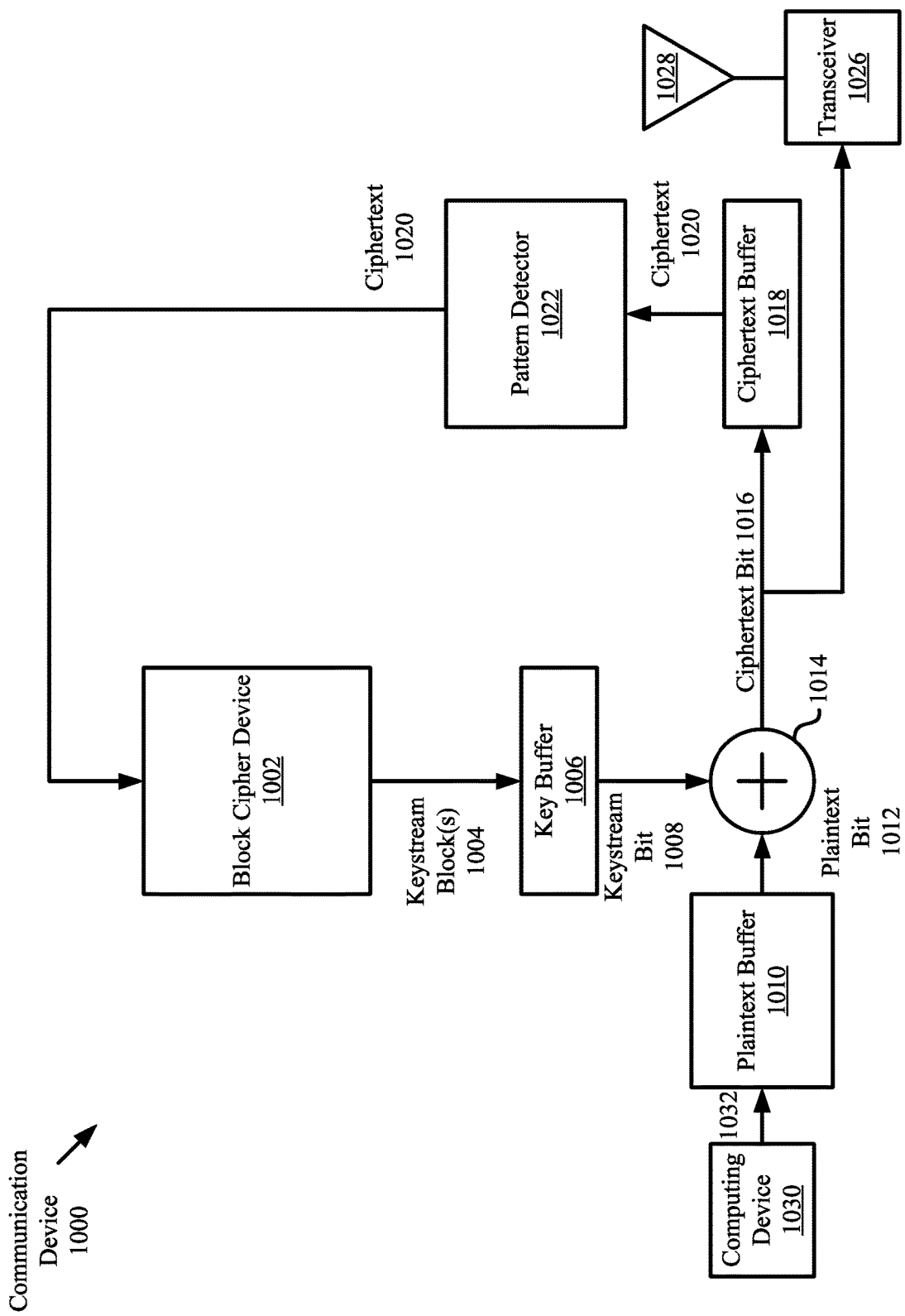

Referring now to FIG. 10, there is provided an illustration that is useful for understanding an illustrative self-synchronizing cipher feedback mode of operation for the transmitting communication device 1000. The communication device 1000 may comprise communication device 902 of FIG. 9.

The communication device 1000 comprises a transmitter circuit employing traditional block cipher encryption. The traditional block cipher encryption can include, but is not limited to, Advanced Encryption Standard (AES) based encryption, Data Encryption Standard (DES) based encryption, International Data Encryption Algorithm (IDEA) based encryption, and/or RC5 based encryption. Each of the listed types of block cipher encryption is well known.

As shown in FIG. 10, the communication device 1000 comprises a block cipher device 1002, a key buffer 1006, a combiner 1014, a computing device 1030, a Plaintext (PT) buffer 1010, a Ciphertext (CT) buffer 1018, a pattern detector 1022, a transceiver 1026 and an antenna 1028. Computing device 1030 can be the same as or similar to computing device 800 of FIG. 8. One or more components 1002, 1006, 1014, 1010, 1018, 1022, 1026, 1028 can be implemented by or integrated with computing device 1030. Accordingly, the listed components comprise hardware, software and/or machine-readable media.

The block cipher device 1002 is configured to perform a block cipher encryption algorithm for encrypting plaintext 1032 generated by computing device 1030. This encryption is achieved using keystream block(s) 1004 output from the block cipher device 1002. The plaintext 1032 is stored in the PT buffer 1010. A single bit 1012 of the plaintext is provided from the PT buffer 1010 to the combiner 1014. The combiner 1014 combines the plaintext bit 1012 with a keystream bit 1008 to generate a ciphertext bit 1016. This combining can be achieved via modulo arithmetic. The ciphertext bit 916 is stored in the CT buffer 1018 and transmitted from the communication device 902 via transceiver 1026 and antenna 1028. Transceivers and antennas are well known.

For self-synchronization of the block cipher device 1002, the pattern detector 1022 obtains ciphertext 1020 from the CT buffer 1018 and analyzes the same to detect a known fixed pattern therein (e.g., 100110101). The known fixed pattern is defined by a given number of bits which is equal to or less than the total number of bits in the keystream block(s) 1004. For example, the keystream block(s) 1004 include(s) sixty-four bits or one hundred twenty eight bits, while the known fixed pattern includes five to eleven bits. The present solution is not limited in this regard.

The length of the known fixed pattern defines the statistical frequency at which the pattern will be detected by the pattern detector 1022. The shorter the pattern the more frequently the pattern is detected by the pattern detector 1022. The longer the pattern the less frequently the pattern is detected by the pattern detector 1022. The pattern length can be selected by a user of the communication device 902, and specifies an average frequency of cryptographic algorithm re-synchronization. Shorter patterns allow for quicker late network entry by the communication device 902 to an established conversation, but with a reduced performance. Longer patterns allow for an improved performance, but with a slower late network entry by the communication device 902. In response to the user selection of a pattern length, the communication device 902 performs operations to configure the pattern detector 1022 to detect a given pattern from a list of pre-defined known fixed patterns which has the user selected pattern length.

When the pattern is detected, the pattern detector 1022 provides the ciphertext 1020 to the block cipher device 1002. The block cipher device 1002 uses the ciphertext 1020 as an initialization value to re-initialize a state of the block cipher encryption algorithm.

It should be noted that the ciphertext 1020 of a given iteration of the pattern detection process can include one or more bits of ciphertext, and can have a total number of bits that is equal to or less than the keystream block(s) 1004. For example, in an N-M (e.g., thirty-seventh) iteration of the pattern detection process, a keystream block 1004 has N bites (e.g., sixty-four bits or one hundred twenty eight bits), while the ciphertext 1020 analyzed by the pattern detector 1022 comprises N-M bits (e.g., thirty-seven bits). M and N are integers. The present solution is not limited to the particulars of this example. The bit size of the ciphertext 1020 can increase by one bit per iteration of the pattern detection process performed by pattern detector 1022.

Figure 11:
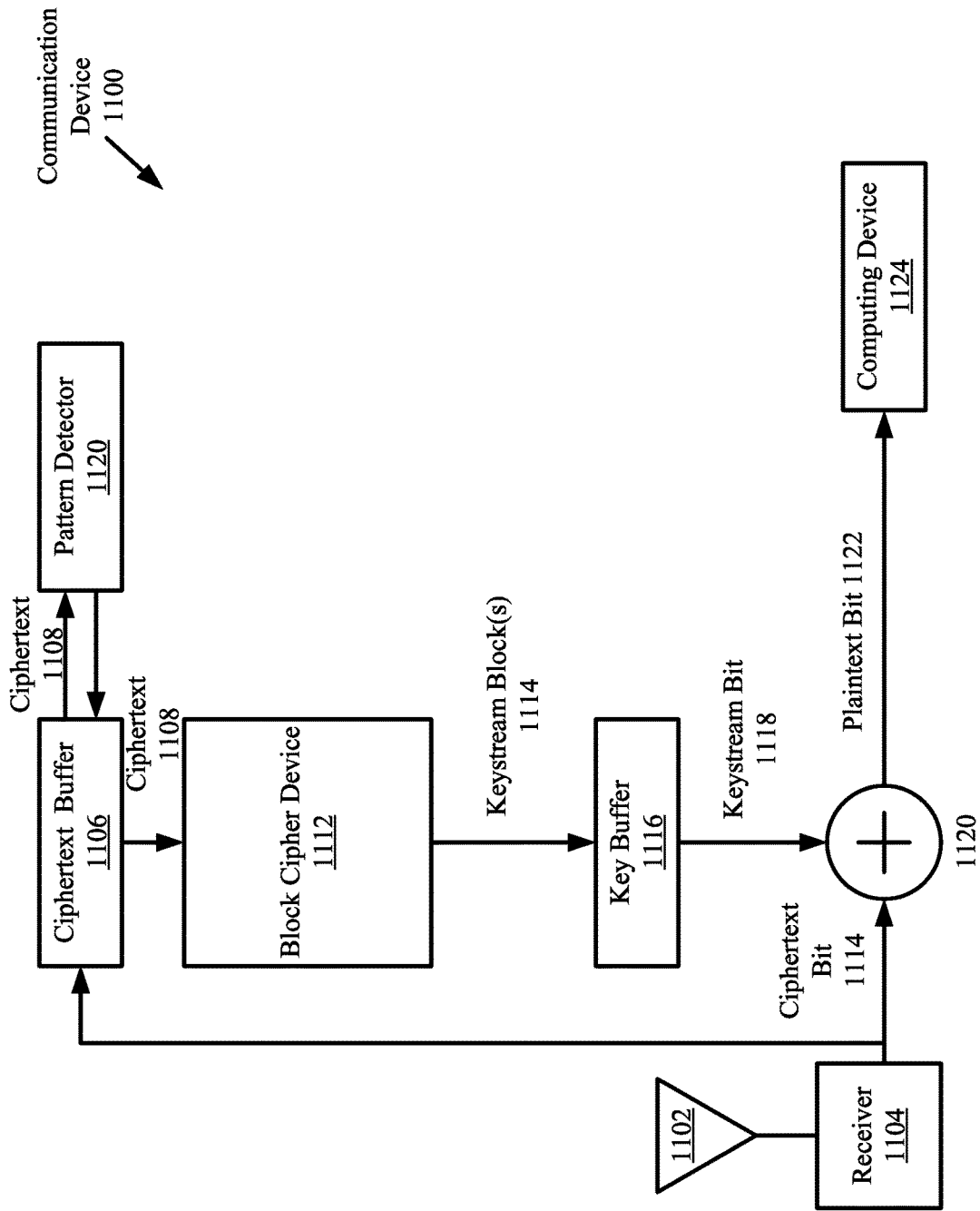

Referring now to FIG. 11, there is provided an illustration that is useful for understanding an illustrative self-synchronizing cipher feedback mode of operation for a receiving communication device 1100. Communication device 1100 can be comprise communication device 904 of FIG. 9.

The communication device 1100 comprises a receiver circuit employing traditional block cipher decryption. The traditional block cipher decryption can include, but is not limited to, AES based decryption, DES based decryption, IDEA based decryption, and/or RC5 based decryption. Each of the listed types of block cipher encryption is well known.

As shown in FIG. 11, the communication device 1100 comprises an antenna 1102, a receiver 1104, a combiner 1120, a computing device 1124, a CT buffer 1106, a pattern detector 1120, a block cipher device 1112, and a key buffer 1116. Computing device 1122 can be the same as or similar to computing device 800 of FIG. 8. One or more components 1002, 1104, 1006, 1011, 1016, 1120 can be implemented by or integrated with computing device 1124. Accordingly, the listed components comprise hardware, software and/or machine-readable media.

Communication device 1100 receives ciphertext (e.g., ciphertext 1016 of FIG. 10) via antenna 1102 and receiver 1104. Ciphertext bits 1114 are provided to the combiner 1120 in a bit-by-bit manner. The combiner 1120 combines each ciphertext bit 1114 with a keystream bit 1118 to generate a plaintext bit 1122. This combining can be achieved via modulo arithmetic. The plaintext bit 1122 is then provided to the computing device 1124. The computing device 1124 can store and further process the plaintext bits (e.g., for display or otherwise output to a user thereof).

The keystream bits 1118 are generated by the block cipher device 1112 and stored in the key buffer 1116. The block cipher device 1112 is configured to perform a block cipher decryption algorithm for decrypting ciphertext 1114 received by communication device 1100. This decryption is achieved using bits of keystream block(s) 1114 output from the block cipher device 1112. As described above, the decryption is achieved by combining ciphertext bits with keystream bits the combiner 1120.

For self-synchronization of the block cipher device 1112, the ciphertext bits 1114 are also provided to the ciphertext buffer 1106 for storage therein. Ciphertext 1108 is provided from the ciphertext buffer 1106 to the pattern detector 1120. Pattern detector 1120 analyzes the ciphertext 1108 to detect a known fixed pattern therein (e.g., 100110101). The known fixed pattern is defined by a given number of bits which is equal to or less than the total number of bits in the keystream block(s) 1114. For example, the keystream block(s) 1114 include(s) sixty-four bits or one hundred twenty eight bits, while the known fixed pattern includes five to eleven bits. The present solution is not limited in this regard. The length of the known fixed pattern defines the statistical frequency at which the pattern will be detected by the pattern detector 1120.

When the pattern is detected, the pattern detector 1120 provides the ciphertext 1108 to the block cipher device 111. The block cipher device 1112 uses the ciphertext 1108 as an initialization value to re-initialize a state of the block cipher decryption algorithm.

The self-synchronization concept discussed above in relation to FIGS. 10-11 can be implemented in systems employing duplex constructions for cryptography. Illustrative communication devices are shown in FIGS. 12-17 which employ duplex constructions and are configured to self-synchronize the same. An illustrative duplex sponge construction is described above in relation to FIG. 2. The discussion of FIG. 2 is sufficient for understanding the cryptographic algorithm employed by the communication devices of FIGS. 12-14.

Figure 12:
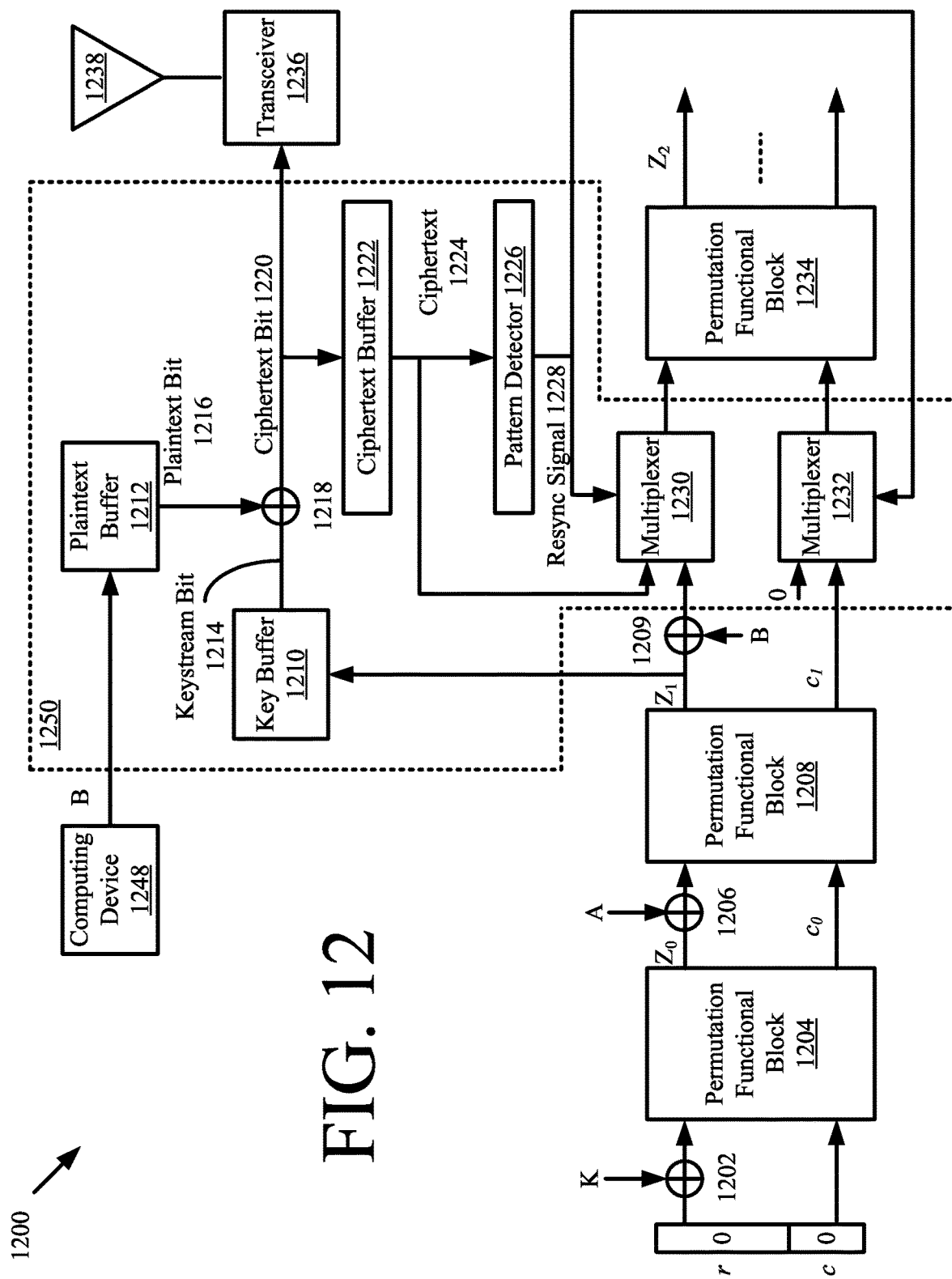

Referring now to FIG. 12, there is provided an illustration of an illustrative transmitting communication device 1200 configured to operate in a self-synchronization mode for synchronizing and re-synchronizing its sponge based cryptographic algorithm. The communication device 1200 may comprise communication device 902 of FIG. 9. The sponge based cryptographic algorithm implements a permutation function $f$ described above in relation to FIGS. 3-5. Accordingly, the communication device 1200 comprises combiners 1202, 1206, 1209 and permutation functional blocks 1204, 1208, 1234. These listed components 1202, 1204, 1206, 1208, 1209, 1234 are the same as or similar to components 226, 208, 228, 210, 230, 212 of FIG. 2. Thus, the discussion of components 226, 208, 228, 210, 230, 212 of FIG. 2 is sufficient for understanding components 1202, 1204, 1206, 1208, 1209, 1234 of FIG. 12.

Communication device 1200 also comprises a synchronization circuit 1250. The synchronization circuit 1250 is configured to facilitate a self-synchronizing mode of operation. The self-synchronizing mode of operation enables automatic cryptographic resynchronization between communication device 1200 and another communication device (e.g., communication device 904 of FIG. 9). Based on pseudo-random events, the communication device 1200 self-synchronizes it's cryptographic algorithm during on-going conversations or communication sessions. The pseudo-random events are based on the ciphertext being transmitted from the communication device 1200 because the ciphertext appears statistically random. The synchronization circuit 1250 is configured to detect patterns in the ciphertext. When a pattern is detected, the synchronization circuit 1250 will cause a state of the cryptographic algorithm to be re-initialized using the ciphertext as an initialization value.

As shown in FIG. 12, the synchronization circuit 1250 comprises a key buffer 1210, a combiner 1218, a PT buffer 1212, a CT buffer 1222, a pattern detector 1226, and multiplexers (or other switching/selection devices) 1230, 1232. The synchronization circuit 1250 is coupled to a computing device 1248. Computing device 1248 can be the same as or similar to computing device 800 of FIG. 8. One or more components of the synchronization circuit 1250 can be implemented by or integrated with computing device 1030. Accordingly, the listed components comprise hardware, software and/or machine-readable media.

During operation, the synchronization circuit 1250 receives message body data B from the computing device 1248 and a keystream block $Z_1$ from permutation functional block 1208. The message body data B is stored in PT buffer 1212, and the keystream block $Z_1$ is stored in key buffer 1210. A single bit 1216 of plaintext is provided from the PT buffer 1212 to the combiner 1218. A single bit 1214 of a keystream block is provided from the key buffer 1210 to the combiner 1218. The combiner 12184 combines the plaintext bit 1216 with the keystream bit 1214 to generate a ciphertext bit 1220. This combining can be achieved via modulo arithmetic. The ciphertext bit 1220 is stored in the CT buffer 1222 and transmitted from the communication device 1200 via a transceiver 1236 and an antenna 1238. Transceivers and antennas are well known.

For self-synchronization of the cryptographic algorithm, the pattern detector 1226 obtains ciphertext 1224 from the CT buffer 1222 and analyzes the same to detect a known fixed pattern therein (e.g., 100110101). The known fixed pattern is defined by a given number of bits which is equal to or less than the total number of bits in the keystream block(s) $Z_1$. For example, the keystream block(s) $Z_1$ include(s) sixty-four bits or one hundred twenty eight bits, while the known fixed pattern includes five to eleven bits. The present solution is not limited in this regard.

The length of the known fixed pattern defines the statistical frequency at which the pattern will be detected by the pattern detector 1226. The shorter the pattern the more frequently the pattern is detected by the pattern detector 1226. The longer the pattern the less frequently the pattern is detected by the pattern detector 1226. The pattern length can be selected by a user of the communication device 1200, and specifies an average frequency of cryptographic algorithm re-synchronization. Shorter patterns allow for quicker late network entry by the communication device 1200 to an established conversation, but with a reduced performance. Longer patterns allow for an improved performance, but with a slower late network entry by the communication device 1200. In response to the user selection of a pattern length, the communication device 1200 performs operations to configure the pattern detector 1226 to detect a given pattern from a list of pre-defined known fixed patterns which has the user selected pattern length.

When the pattern is detected, the pattern detector 1226 generates and provides a resynchronization signal 1228 to multiplexers 1230, 1232. The resynchronization signal 1228 causes the ciphertext 1224 to be passed to the permutation functional block 1234 instead of the keystream block $Z_1$, and causes a value of zero to be passed to the permutation functional block 1234 instead of the capacity $c_1$. The permutation functional block 1234 uses the ciphertext 1224 and zero value to re-initialize the cryptographic algorithm. More specifically, the unique permutation function $f$ is performed in the permutation functional block 1234 using the ciphertext 1224 and zero value as inputs to generate a keystream block $Z_2$.

It should be noted that the keystream block $Z_1$ and capacity $c_1$ are passed to the permutation functional block 1234 when the pattern is not detected by the pattern detector 1226 and the resynchronization signal 1228 is not being provided to the multiplexers 1230, 1232. In these scenarios, the permutation function $f$ is performed in the permutation functional block 1234 using the keystream block $Z_1$ and capacity $c_1$ as inputs to generate a keystream block $Z_2$.

It should be noted that the ciphertext 1224 of a given iteration of the pattern detection process can include one or more bits of ciphertext, and can have a total number of bits that is equal to or less than the keystream block(s) $Z_1$. For example, in an N-M (e.g., thirty-seventh) iteration of the pattern detection process, a keystream block $Z_1$ has N bites (e.g., sixty-four bits or one hundred twenty eight bits), while the ciphertext 1224 analyzed by the pattern detector 1226 comprises N-M bits (e.g., thirty-seven bits). M and N are integers. The present solution is not limited to the particulars of this example. The bit size of the ciphertext 1224 can increase by one bit per iteration of the pattern detection process performed by pattern detector 1226.

In some scenarios, the keystream block(s) can be truncated in manner described above in relation to FIG. 2. An illustration showing a modified version of the duplex construction 200 is provided in FIG. 13. The modified duplex construction 200' includes the synchronization circuit 1250 of FIG. 12 inserted between permutation functional blocks 210 and 212.

Figure 14:
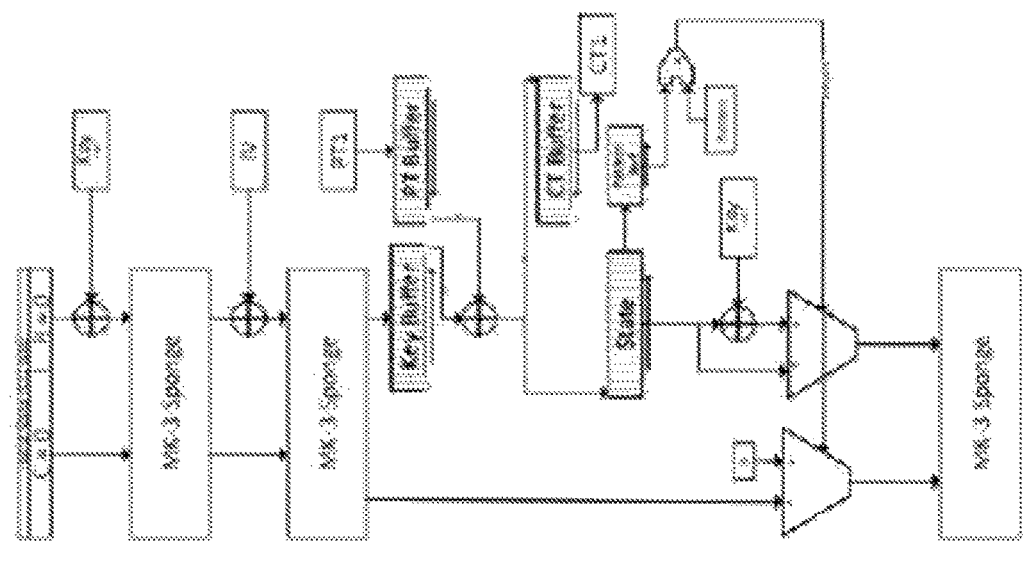

The duplex construction employed by communication device can comprise an MK-3 cryptographic algorithm. An illustration showing implementation of the present solution in an MK-3 context is provided in FIG. 14. As shown in FIG. 14, the MK-3 cryptographic algorithm first absorbs the key into the algorithm state. In a next iteration, the Initialization Variable (IV) is absorbed into the algorithm state. Following the second iteration, the MK-3 cryptographic algorithm is ready to process data. The Rate (R) portion of algorithm state is loaded into the key buffer and plaintext is loaded into the plaintext buffer. The contents of the key and plaintext buffers are left shifted by one bit at a time, mod-2 added together and left shifted into the ciphertext buffer. Encryption continues in this manner until another iteration is initiated. Another iteration will begin either when the entire block of keystream is consumed or when the pattern detector is triggered. If another iteration is triggered when a block of keystream is consumed, the ciphertext buffer contents are concatenated with the capacity portion of the algorithm state and passed on for the next iteration of processing by the MK-3 cryptographic algorithm. If another iteration is triggered by the pattern detector, the traffic key is re-absorbed by mod-2 adding it into the ciphertext buffer. The ciphertext buffer contents are concatenated with a vector of all zeros and are passed on for the next iteration of processing by the MK-3 cryptographic algorithm.

Figure 15:
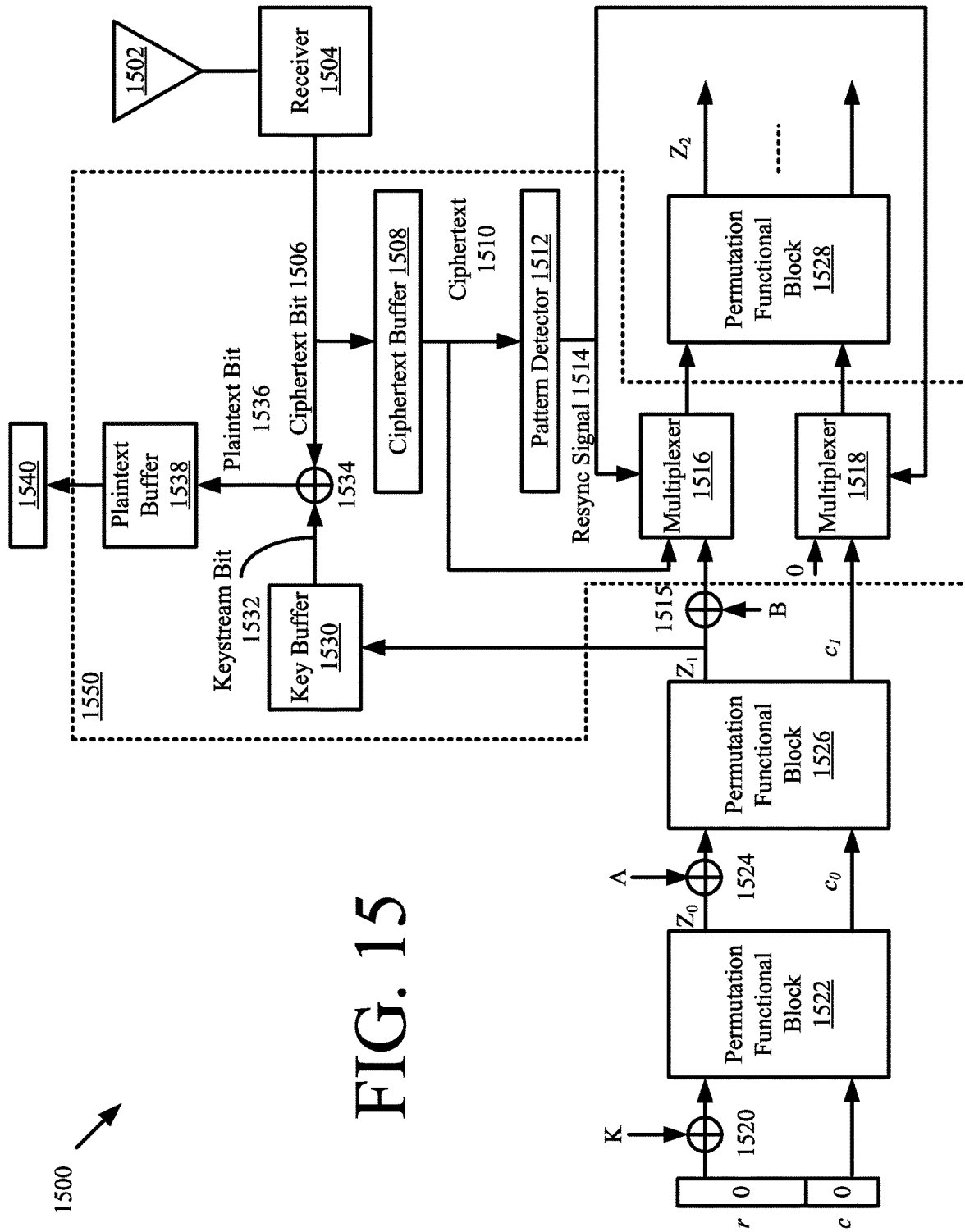

Referring now to FIG. 15, there is provided an illustration of a receiving communication device 1500 that is configured to operate in a self-synchronization mode for synchronizing and re-synchronizing its sponge based cryptographic algorithm. The communication device 1500 can be comprise communication device 904 of FIG. 9.

The sponge based cryptographic algorithm implements a permutation function $f$ described above in relation to FIGS. 3-5. Accordingly, the communication device 1500 comprises combiners 1520, 1524, 1515 and permutation functional blocks 1522, 1526, 1528. These listed components 1515, 1520-1528 are the same as or similar to components 226, 208, 228, 210, 230, 212 of FIG. 2. Thus, the discussion of components 226, 208, 228, 210, 230, 212 of FIG. 2 is sufficient for understanding components 1515, 1520-1528 of FIG. 15.

Communication device 1500 also comprises a synchronization circuit 1550. The synchronization circuit 1550 is configured to facilitate a self-synchronizing mode of operation. The self-synchronizing mode of operation enables automatic cryptographic resynchronization between communication device 1500 and another communication device (e.g., communication device 902 of FIG. 9). Based on pseudo-random events, the communication device 1500 self-synchronizes it's cryptographic algorithm during on-going conversations or communication sessions. The pseudo-random events are based on the ciphertext being transmitted from the communication device 1500 because the ciphertext appears statistically random. The synchronization circuit 1550 is configured to detect patterns in the ciphertext. When a pattern is detected, the synchronization circuit 1550 will cause a state of the cryptographic algorithm to be re-initialized using the ciphertext as an initialization value.

As shown in FIG. 15, the synchronization circuit 1550 comprises a key buffer 1530, a combiner 1534, a PT buffer 1538, a CT buffer 1508, a pattern detector 1512, and multiplexers (or other switching/selection devices) 1516, 1518. The synchronization circuit 1550 is coupled to a receiver 1504 and a computing device 1540. Computing device 1540 can be the same as or similar to computing device 800 of FIG. 8. One or more components of the synchronization circuit 1550 can be implemented by or integrated with computing device 1540. Accordingly, the listed components comprise hardware, software and/or machine-readable media.

During operation, the communication device 1500 receives ciphertext via antenna 1502 and receiver 1504. The ciphertext 1506 is passed to the synchronization circuit 1550. At the synchronization circuit 1550, the ciphertext 1506 is stored in the CT buffer 1508, and provided to the combiner 1534 in a bit-by-bit manner. The combiner 1534 combines each ciphertext bit 1506 with a keystream bit 1532 to generate a plaintext bit 1536. This combining can be achieved via modulo arithmetic. The plainttext bit 1536 is then provided to the computing device 1540. The computing device 1540 can store and further process the plainttext bits (e.g., for display or otherwise output to a user thereof).

The keystream bits 1532 are generated by the cryptographic algorithm and stored in the key buffer 1530. The cryptographic algorithm is configured to perform a sponge based decryption algorithm for decrypting ciphertext 1506 received by communication device 1500. This decryption is achieved using bits of keystream block(s) $Z_1$ output from the cryptographic device. As described above, the decryption is achieved by combining ciphertext bits with keystream bits the combiner 1534.

For self-synchronization of the cryptographic algorithm, the ciphertext 1510 is provided from the ciphertext buffer 1508 to the pattern detector 1512. Pattern detector 1512 analyzes the ciphertext 1510 to detect a known fixed pattern therein (e.g., 100110101). The known fixed pattern is defined by a given number of bits which is equal to or less than the total number of bits in the keystream block(s) $Z_1$. For example, the keystream block(s) $Z_1$ include(s) sixty-four bits or one hundred twenty eight bits, while the known fixed pattern includes five to eleven bits. The present solution is not limited in this regard. The length of the known fixed pattern defines the statistical frequency at which the pattern will be detected by the pattern detector 1512.

When the pattern is detected, the pattern detector 1512 generates and provides a resynchronization signal 1514 to multiplexers 1516, 1518. The resynchronization signal 1514 causes the ciphertext 1510 to be passed to the permutation functional block 1528 instead of the keystream block $Z_1$, and causes a value of zero to be passed to the permutation functional block 1528 instead of the capacity $c_1$. The permutation functional block 1528 uses the ciphertext 1510 and zero value to re-initialize the cryptographic algorithm. More specifically, the unique permutation function ƒ is performed in the permutation functional block 1528 using the ciphertext 1510 and zero value as inputs to generate a keystream block $Z_2$.

It should be noted that the keystream block $Z_1$ and capacity $c_1$ are passed to the permutation functional block 1528 when the pattern is not detected by the pattern detector 1512 and the resynchronization signal 1514 is not being provided to the multiplexers 1516, 1518. In these scenarios, the permutation function ƒ is performed in the permutation functional block 1528 using the keystream block $Z_1$ and capacity $c_1$ as inputs to generate a keystream block $Z_2$.

Figure 16:
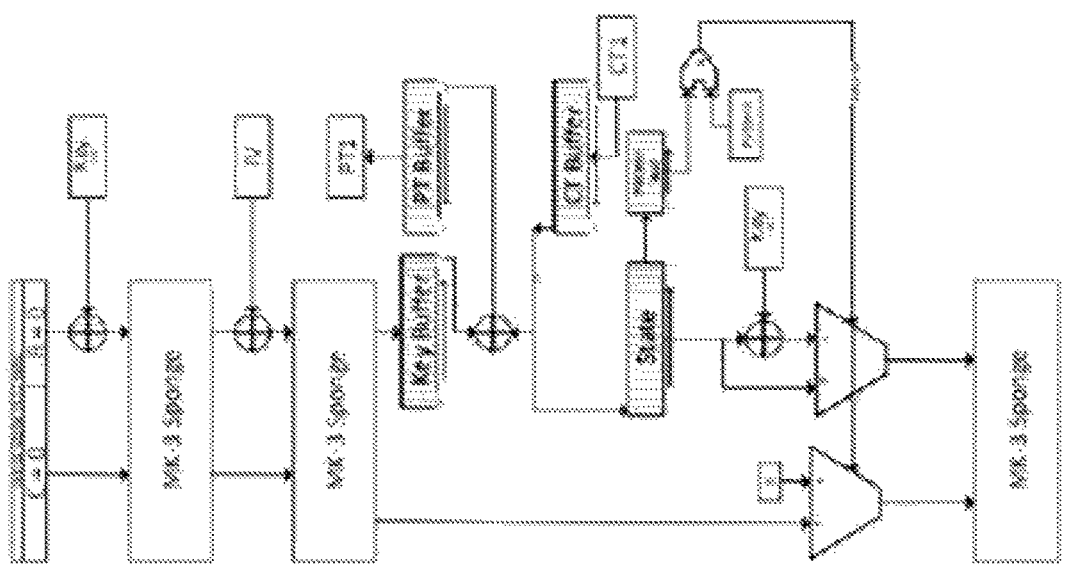

Referring now to FIG. 16, there is provided an illustration of a receiving communication device implementing an MK-3 cryptographic algorithm and configured to synchronize/re-synchronize the same in accordance with the present solution.

Figure 13:
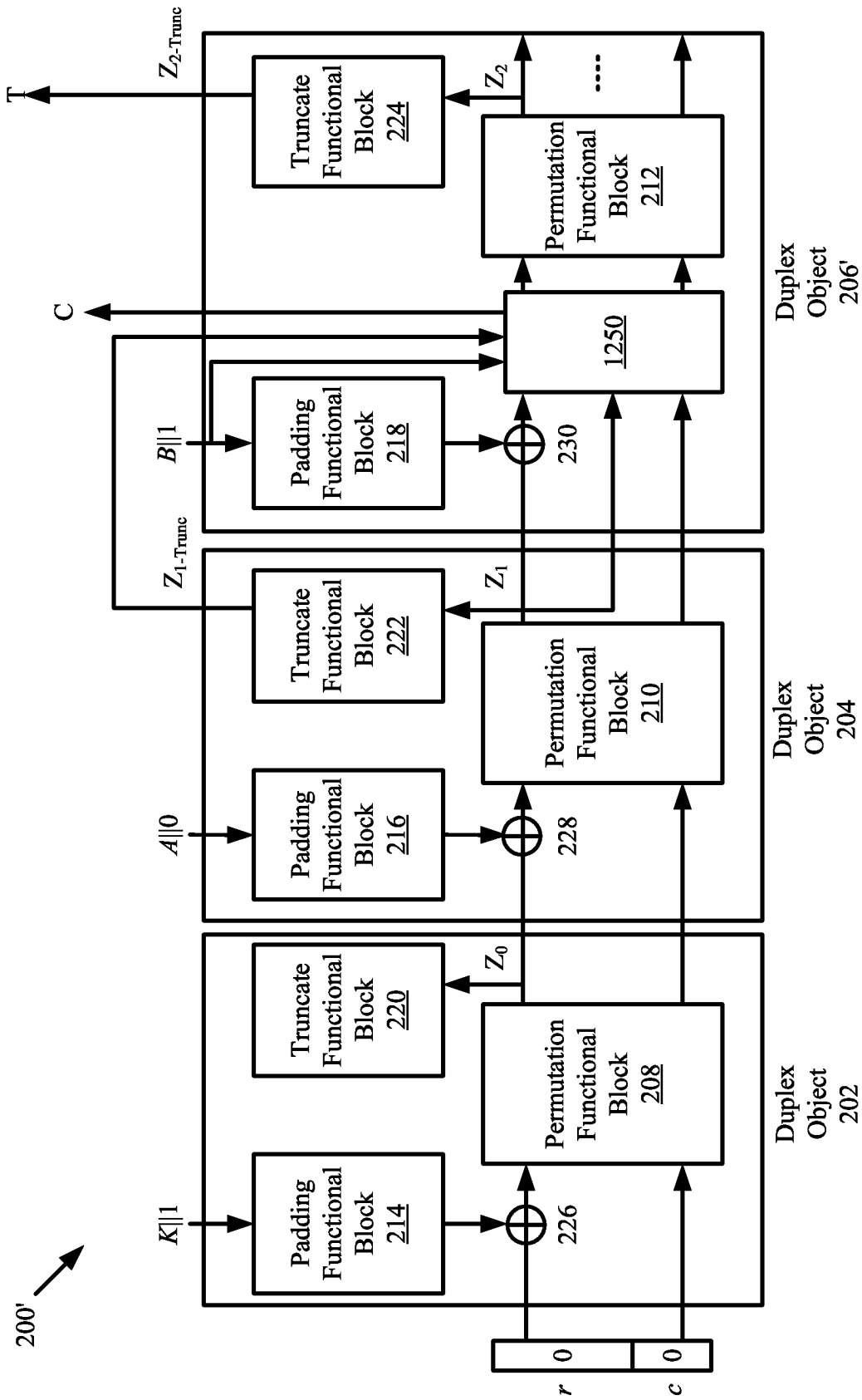

Referring now to FIG. 17, there is provided an illustration of a flow diagram of an illustrative method 1700 for operating a communication device (e.g., communication device 902 of FIG. 9, 904 of FIG. 9, 1200 of FIG. 12, 1300 of FIG. 13, 200' of FIG. 13, 1400 of FIG. 14, 1500 of FIG. 15 or 1600 of FIG. 16). Method 1700 begins with 1702 and continues to 1704 where ciphertext is obtained. 1704 can involve generating the ciphertext by a cryptographic system in accordance with a cryptographic algorithm or receiving the ciphertext from a remote device. The cryptographic algorithm can include, but is not limited to, an adaption of a sponge construction framework. The adaptation of the sponge construction framework can include, but is not limited to, a duplex construction in which a permutation function is iteratively performed (e.g., as shown in FIG. 2).

Next, a decision is made in 1706 as to whether a pseudo-random event has been detected. This detection can be made based on an analysis of the ciphertext. For example, the system can analyze the ciphertext to determine whether a given sequence of values exits within the ciphertext. If the given sequence of values does exist within the ciphertext so, then the pseudo-random event is deemed to exist.

When the pseudo-random event does not exist (e.g., the given sequence of values does not exist within the ciphertext), then method 1700 continues with 1712 which will be discussed below. In contrast, when the pseudo-random event does exit, then method 1700 continues with 1710-1712. 1710 involves synchronizing the cryptographic system with another cryptographic system using the ciphertext as at least part of an initialization value for the cryptographic algorithm. In some scenarios, the ciphertext is used in 1710 as a bitrate portion r of the initialization value, while zero is used as a capacity portion c of the initialization value for the cryptographic algorithm. In 1712, the cryptographic algorithm is performed to encrypt or decrypt information. It should be noted that in some scenarios results from combining plaintext with a keystream block is used in 1712 as the bitrate portion of the initialization value for a cryptographic algorithm when the pseudo-random event was not detected in 1706 (and/or a determination is made that a given sequence of values does not exist within the ciphertext).

Subsequently, 1714 is performed where method 1700 ends or other operations are performed (e.g., return to 1702).

All of the apparatus, methods, and algorithms disclosed and claimed herein can be made and executed without undue experimentation in light of the present disclosure. While the present solution has been described in terms of preferred embodiments, it will be apparent to those having ordinary skill in the art that variations may be applied to the apparatus, methods and sequence of steps of the method without departing from the concept, spirit and scope of the present solution. More specifically, it will be apparent that certain components may be added to, combined with, or substituted for the components described herein while the same or similar results would be achieved. All such similar substitutes and modifications apparent to those having ordinary skill in the art are deemed to be within the spirit, scope and concept of the present solution as defined.

The features and functions disclosed above, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

We claim:

1. A method for operating a cryptographic system, comprising:
   obtaining ciphertext by the cryptographic system;
   performing operations by the cryptographic system to determine whether a given sequence of values exits within the ciphertext based on results from analyzing encrypted data of the ciphertext without being decrypted;
   generating, by the cryptographic system, an initialization value for a cryptographic algorithm responsive to a determination that the given sequence of values exists within the ciphertext, wherein the initialization value comprises a bitrate portion including the ciphertext and a capacity portion set to zero; and
   synchronizing the cryptographic system with another cryptographic system using the initialization value for the cryptographic algorithm;
   wherein the cryptographic algorithm comprises an adaption of a sponge construction framework.

2. The method according to claim 1, further comprising using results from combining the plaintext with a keystream block as the bitrate portion of the initialization value for a cryptographic algorithm when a determination is made that the given sequence of values does not exist within the ciphertext.

3. The method according to claim 1, wherein the adaptation of the sponge construction framework comprises a duplex construction in which a permutation function is iteratively performed.

4. The method according to claim 1, wherein the ciphertext is generated by the cryptographic system in accordance with the cryptographic algorithm or received from a remote device that generated the ciphertext.

5. The method according to claim 1, further comprising using the synchronized cryptographic algorithm to decrypt the ciphertext or to encrypt plaintext.

6. A system, comprising:
   a processor;
   a non-transitory computer-readable medium comprising programming instruction that are configured to cause the processor to implement a method for operating a cryptographic algorithm, wherein the programming instructions comprise instructions to:
   obtaining ciphertext by the cryptographic system;
   performing operations by the cryptographic system to determine whether a given sequence of values exits within the ciphertext;
   generating an initialization value for a cryptographic algorithm responsive to a determination that the given sequence of values exists within the ciphertext, wherein the initialization value comprises a bitrate portion including the ciphertext and a capacity portion set to zero; and
   synchronizing the cryptographic system with another cryptographic system using the initialization value for the cryptographic algorithm;
   wherein the cryptographic algorithm comprises an adaption of a sponge construction framework.

7. The system according to claim 6, wherein the programming instructions further comprise instructions to cause the processor to use results from combining the plaintext with a keystream block as the bitrate portion of the initialization value for a cryptographic algorithm when a determination is made that the given sequence of values does not exist within the ciphertext.

8. The system according to claim 6, wherein the adaptation of the sponge construction framework comprises a duplex construction in which a permutation function is iteratively performed.

9. The system according to claim 6, wherein the ciphertext is generated by the processor in accordance with the cryptographic algorithm or received by the system from a remote device that generated the ciphertext.

10. The system according to claim 6, further comprising using the synchronized cryptographic algorithm to decrypt the ciphertext or to encrypt plaintext.

11. A communication device, comprising:
    a transceiver configured to transmit and receive signals including ciphertext;
    a cryptographic circuit configured to encrypt and decrypt information in accordance with a cryptographic algorithm; and
    a synchronization circuit configured to synchronize the cryptographic algorithm with a cryptographic algorithm of another communication device based on a detection of a pseudo-random event during an on-going communication session;
    wherein the pseudo-random event is detected via an analysis of the ciphertext; and
    wherein the cryptographic algorithm is initialized using an initialization value generated response to a detection of the pseudo-random event, the initialization value comprising a bitrate portion including the ciphertext and a capacity portion set to zero;
    wherein the cryptographic algorithm comprises an adaption of a sponge construction framework.

12. The communication device according to claim 11, wherein results from combining the plaintext with a keystream block is used as the bitrate portion of the initialization value for the cryptographic algorithm when the pseudo-random event is not detected.

13. The communication device according to claim 11, wherein the adaptation of the sponge construction framework comprises a duplex construction in which a permutation function is iteratively performed.

14. The communication device according to claim 11, wherein the ciphertext is generated by the cryptographic circuit in accordance with the cryptographic algorithm or is received by the transceiver from the another communication device which generated the ciphertext.

15. The communication device according to claim 11, wherein the cryptographic circuit uses the synchronized cryptographic algorithm to decrypt the cipherext or to encrypt plaintext.

* * * * *